(12) United States Patent
Tomoda (10) Patent No.: US 11,131,058 B2
(45) Date of Patent: Sep. 28, 2021

(54) METHOD FOR MANUFACTURING CORE WIRE FOR TRANSMISSION BELT, TREATMENT AGENT, AND KIT FOR TREATMENT

(71) Applicant: Mitsuboshi Belting Ltd., Kobe (JP)

(72) Inventor: Takuya Tomoda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 65 days.

(21) Appl. No.: 15/770,376

(22) PCT Filed: Oct. 27, 2016

(86) PCT No.: PCT/JP2016/081834
§ 371 (c)(1),
(2) Date: Apr. 23, 2018

(87) PCT Pub. No.: WO2017/073647
PCT Pub. Date: May 4, 2017

(65) Prior Publication Data
US 2018/0313028 A1    Nov. 1, 2018

(30) Foreign Application Priority Data

Oct. 29, 2015 (JP) .............................. JP2015-213243
Oct. 18, 2016 (JP) .............................. JP2016-204528

(51) Int. Cl.
| | | |
|---|---|---|
| *D06M 13/127* | (2006.01) |
| *F16G 5/20* | (2006.01) |
| *F16G 1/28* | (2006.01) |
| *F16G 1/10* | (2006.01) |
| *C08J 5/06* | (2006.01) |
| *D06M 15/59* | (2006.01) |
| *D06M 15/693* | (2006.01) |
| *D06M 13/152* | (2006.01) |
| *F16G 5/08* | (2006.01) |

(52) U.S. Cl.
CPC .......... *D06M 13/127* (2013.01); *C08J 5/06* (2013.01); *D06M 13/152* (2013.01); *D06M 15/59* (2013.01); *D06M 15/693* (2013.01); *F16G 1/10* (2013.01); *F16G 1/28* (2013.01); *F16G 5/08* (2013.01); *F16G 5/20* (2013.01)

(58) Field of Classification Search
CPC .. D06M 13/127; D06M 15/59; D06M 15/693; D06M 13/152; F16G 5/20; F16G 5/08; F16G 1/28; F16G 1/10; C08J 5/06
See application file for complete search history.

(56) References Cited

U.S. PATENT DOCUMENTS

| | | | |
|---|---|---|---|
| 3,661,623 A | 5/1972 | Bhakuni et al. | |
| 3,821,017 A | 6/1974 | Bhakuni et al. | |
| 5,860,883 A * | 1/1999 | Jonen | C08K 5/098 |
| | | | 474/205 |
| 6,007,897 A | 12/1999 | Tamaki et al. | |
| 6,512,039 B1 * | 1/2003 | Mowrey | C08G 18/706 |
| | | | 524/492 |
| 6,828,385 B2 | 12/2004 | Gamlin et al. | |
| 2002/0132692 A1 | 9/2002 | Knutson | |
| 2003/0109642 A1 | 6/2003 | Gamlin et al. | |
| 2003/0130077 A1 | 7/2003 | Knutson | |
| 2003/0198794 A1 * | 10/2003 | Fukuyama | C08G 18/58 |
| | | | 428/292.1 |
| 2004/0132571 A1 | 7/2004 | Knutson | |
| 2006/0287148 A1 * | 12/2006 | Wood | F16G 5/06 |
| | | | 474/260 |
| 2009/0056849 A1 * | 3/2009 | Imaoka | B60C 9/0042 |
| | | | 152/451 |
| 2012/0071595 A1 | 3/2012 | Laufer et al. | |
| 2012/0100290 A1 | 4/2012 | Laufer et al. | |
| 2013/0217528 A1 | 8/2013 | Matsumoto et al. | |
| 2013/0281604 A1 | 10/2013 | Senda et al. | |

FOREIGN PATENT DOCUMENTS

| | | | | |
|---|---|---|---|---|
| CN | 1183521 A | 6/1998 | | |
| CN | 1726356 A | 1/2006 | | |
| CN | 102432932 A | 5/2012 | | |
| CN | 102433081 A | 5/2012 | | |
| CN | 103290697 A | 9/2013 | | |
| CN | 103380246 A | 10/2013 | | |
| EP | 0940429 A1 * | 9/1999 | ............... | C08K 3/00 |
| EP | 2460649 A1 | 6/2012 | | |
| JP | 2006-274492 A | 10/2006 | | |
| JP | 2012-046750 A | 3/2012 | | |
| JP | 2012046749 A * | 3/2012 | ............ | C08G 18/02 |
| JP | 2012-149363 A | 8/2012 | | |
| JP | 2013-170333 A | 9/2013 | | |
| WO | 2003-031479 A1 | 4/2003 | | |

OTHER PUBLICATIONS

Jun. 5, 2019—(EP) Extended Search Report—App 16859876.1.
Jan. 17, 2017—International Search Report—Intl App PCT/JP2016/081834.
Nov. 15, 2019—(CN) Notification of First Office Action—App 201680063218.9.
May 15, 2020—(CN) Notification of the Second Office Action—App 201680063218.9—Eng Tran.

* cited by examiner

*Primary Examiner* — Amina S Khan
(74) *Attorney, Agent, or Firm* — Banner & Witcoff, Ltd.

(57) ABSTRACT

The present invention relates to a method for manufacturing a cord for a power transmission belt, including a first treatment step of treating an untreated yarn of a cord for a power transmission belt with a first treatment agent containing: a rubber composition (A) containing a condensate (A1) of a resorcin and formaldehyde, a rubber component (A2) containing a carboxy-modified latex, and a curing agent (A3) containing a polycarbodiimide resin having a plurality of carbodiimide groups; and a hydrophilic solvent (B).

12 Claims, 2 Drawing Sheets

METHOD FOR MANUFACTURING CORE WIRE FOR TRANSMISSION BELT, TREATMENT AGENT, AND KIT FOR TREATMENT

CROSS REFERENCE TO RELATED APPLICATIONS

This is a U.S. National Phase Application under 35 U.S.C. § 371 of International Application No. PCT/JP2016/081834, filed Oct. 27, 2016, which claims priority to Japanese Application Nos. 2015-213243 filed Oct. 29, 2015 and 2016-204528 filed Oct. 18, 2016, which was published Under PCT Article 21(2), the entire contents of which are incorporated herein by reference.

TECHNICAL FIELD

The present invention relates to a method for manufacturing a cord used for a power transmission belt, and a treatment agent and treatment kit used for the manufacturing method.

BACKGROUND ART

There are various forms of power transmission belts, and a general form includes a vulcanized rubber layer with a tension member embedded therein. As such a tension member, a glass cord, a polyester cord, a polyamide cord, an aramid cord, and the like are generally used, and among these, a para-aramid cord (a cord obtained by twisting raw yarn of a para-aramid fiber) is preferable from a viewpoint of having both strength and elasticity. However, the para-aramid fiber has low adhesiveness to rubber as compared to a polyester fiber or polyamide fiber. In addition, when a force peeling a tension member from rubber acts thereon, peeling easily occurs due to damage between fibers or cutting of fibers. Moreover, in the case of using a power transmission belt in the state where the para-aramid cord is exposed to a lateral surface thereof, such as a V-ribbed belt or a raw-edge V belt, when adhesion between fibers inside the para-aramid cord (between filaments of the cord) is not sufficient, fraying of the cord easily occurs. Accordingly, a method of performing a treatment (adhesion treatment) of immersing a para-aramid fiber in a treatment agent containing a component improving adhesiveness has been carried out, for improving adhesiveness between a para-aramid cord and rubber and improving adhesion force between fibers inside the cord, thereby preventing peeling or fraying. On the other hand, when adhesion treatment is performed, the para-aramid cord becomes rigid due to curing of the treatment agent and bending fatigue resistance of the power transmission belt may deteriorate in some cases, and thus it is also necessary to consider suppression thereof.

The adhesion treatment includes a method of performing an adhesion treatment in a state of raw yarn (a twistless filaments) and a method of performing an adhesion treatment on a twisted yarn cord (an untreated twisted yarn cord) obtained by twisting raw yarn. Among these methods, the method of performing an adhesion treatment in a state of raw yarn is excellent from a viewpoint of peeling resistance or fraying resistance since a treatment agent is sufficiently impregnated between the fibers of raw yarn. Meanwhile, in the method of performing an adhesion treatment in a state of twisted yarn cord, improving peeling resistance or fraying resistance is difficult. In addition, as a treatment agent, there are mainly an aqueous treatment agent containing a rubber component (latex) and an organic solvent-based treatment agent containing a resin component, and the aqueous treatment agent is preferable from a viewpoint of a smaller load to the environment.

JP-A-2013-170333 (Patent Document 1) discloses that, when raw yarn of an aramid cord used for a power transmission belt is treated with a treatment agent obtained by combining a condensate (RF condensate) of a resorcin (R) and formaldehyde (F), a latex, and a water-soluble epoxy compound, probably because the treatment agent can homogeneously and efficiently permeate and be impregnated between filaments of the raw yarn and an amino group and/or carboxy group remaining in the aramid fiber and a hydroxy group of the RF condensate homogeneously react with an epoxy group of the water-soluble epoxy compound to improve the surface quality of the aramid raw yarn, convergence of the filaments can be improved, and since moderate flexibility can be provided due to the latex, both the fraying resistance on a lateral surface of the power transmission belt and the bending fatigue resistance of the power transmission belt can be achieved.

However, even if a treatment is performed with this treatment agent, during actual use of a power transmission belt, fraying resistance is not sufficiently exhibited in some cases depending on the usage or the use environment (e.g., severe traveling condition).

JP-A-2006-274492 (Patent Document 2) discloses a fiber cord for rubber reinforcement having at least two or more adhesive layers on a fiber surface, in which a first layer adhesive contains a mixture of a rubber latex and a resorcin-formaldehyde initial condensate not containing a tackifier, a second layer adhesive contains a mixture of a rubber latex and a resorcin-formaldehyde initial condensate containing a tackifier, and in the second layer adhesive, a molar ratio of resorcin/formalin of the resorcin-formaldehyde initial condensate is within a range of 1/0.25 to 1/1, and a solid content weight ratio of the resorcin-formaldehyde initial condensate/rubber latex is within a range of $1/3$ to $1/10$. Patent Document 2 discloses that it is preferable to perform a pre-treatment with an adhesive containing an aqueous urethane resin, a polyepoxide compound, a blocked polyisocyanate compound, and a rubber latex.

However, in this fiber cord, probably because permeation of the treatment agent between fibers is inhibited by curing reaction of the epoxy compound, firm adhesion between the fibers cannot be achieved and fraying resistance is not sufficiently exhibited.

JP-A-2012-46750 (Patent Document 3) discloses an adhesive formulation containing an activating agent and an aqueous resorcinol-formaldehyde-latex dispersed system containing a carbodiimide such as TDI carbodiimide, as an adhesive formulation for improving bonding strength between a reinforced fiber and an elastomer in a tire, a driving belt, a conveyor belt and/or a hose. This document discloses that the latex is preferably a styrene-butadiene-vinylpyridine copolymer latex, which is used in Examples.

However, in this document, the adhesive formulation is used for the purpose of bonding a reinforced fiber and a cross-linked rubber and/or elastomer (forming a specific surface coating for enhancing adhesiveness to rubber on a surface of a fiber member), and adhesion between fibers (making an adhesive permeate the inside of the fiber member to adhere thereto) is not supposed. In addition, even if this adhesive formulation is applied to a twisted yarn cord, fraying resistance is not sufficiently exhibited.

PRIOR ART DOCUMENT

Patent Document

Patent Document 1: JP-A-2013-170333 (claim 1 and paragraph [0011])
Patent Document 2: JP-A-2006-274492 (claim 1, paragraph [0047], and Examples)
Patent Document 3: JP-A-2012-46750 (Claims, paragraph [0023], and Examples)

SUMMARY OF THE INVENTION

Problem to be Solved by the Invention

An object of the present invention is to provide a method for manufacturing a cord for a power transmission belt which enables firm adhesion between fibers even in a twisted yarn cord while maintaining bending fatigue resistance (flexibility) and can improve fraying resistance, and a treatment agent and treatment kit used for this manufacturing method.

Another object of the present invention is to provide a method for manufacturing a cord for a power transmission belt which imposes a small load to the environment and can improve adhesiveness to rubber in which the cord is embedded, and a treatment agent and treatment kit used for this manufacturing method.

Means for Solving the Problem

As a result of an intensive investigation for solving the problem, the present inventors found out that, by treating an untreated yarn of a cord for a power transmission belt with a first treatment agent containing a rubber composition (A) containing a condensate (A1) of a resorcin and formaldehyde, a rubber component (A2) containing a carboxy-modified latex and a curing agent (A3) containing a polycarbodiimide resin having a plurality of carbodiimide groups, and a hydrophilic solvent (B), firm adhesion between fibers is achieved even in a twisted yarn cord while maintaining bending fatigue resistance (flexibility) and fraying resistance can be improved, and thereby completed the present invention.

That is, a method for manufacturing a cord for a power transmission belt of the present invention includes a first treatment step of treating an untreated yarn of a cord for a power transmission belt with a first treatment agent containing a rubber composition (A) containing a condensate (A1) of a resorcin and formaldehyde, a rubber component (A2) containing a carboxy-modified latex, and a curing agent (A3) containing a polycarbodiimide resin having a plurality of carbodiimide groups, and a hydrophilic solvent (B). The carboxy-modified latex may be at least one selected from the group consisting of a carboxy-modified acrylonitrile-butadiene copolymer latex, a carboxy-modified hydrogenated acrylonitrile-butadiene copolymer latex, a carboxy-modified styrene-butadiene copolymer latex, and a carboxy-modified styrene-butadiene-vinylpyridine copolymer latex. The polycarbodiimide resin has a chemical formula weight (NCN equivalent) per mole of a carbodiimide group of approximately 300 to 450. A proportion of the curing agent (A3) is set to approximately 1 to 10 parts by mass relative to 100 parts by mass of the rubber component (A2). A proportion of the rubber composition (A) is set to approximately 15% to 20% by mass based on the entirety of the first treatment agent. A proportion of the condensate (A1) is set to approximately 1 to 100 parts by mass relative to 100 parts by mass of the rubber component (A2). The hydrophilic solvent (B) may contain water, and the polycarbodiimide resin may form micelles.

The manufacturing method of the present invention may further include a second treatment step of treating a first treated yarn of the cord for a power transmission belt treated in the first treatment step with a second treatment agent containing a resorcin, formaldehyde and a latex. The manufacturing method of the present invention may further include a third treatment step of treating a second treated yarn of the cord for a power transmission belt treated with the second treatment agent containing a resorcin, formaldehyde and a latex in the second treatment step with a third treatment agent containing a rubber. The manufacturing method of the present invention may include the third treatment step of treating the first treated yarn of the cord for a power transmission belt treated in the first treatment step with the third treatment agent containing a rubber without undergoing the second treatment step. The untreated yarn of the cord for a power transmission belt may be a twisted yarn cord. The cord for a power transmission belt may be an aramid cord.

The present invention also includes a treatment agent for treating an untreated yarn of a cord for a power transmission belt, the treatment agent containing a rubber composition (A) containing a condensate (A1) of a resorcin and formaldehyde, a rubber component (A2) containing a carboxy-modified latex and a curing agent (A3) containing a polycarbodiimide resin having a plurality of carbodiimide groups, and a hydrophilic solvent (B).

The present invention also includes a treatment kit for treating an untreated yarn of a cord for a power transmission belt, the treatment kit including: a first treatment agent containing a rubber composition (A) containing a condensate (A1) of a resorcin and formaldehyde, a rubber component (A2) containing a carboxy-modified latex and a curing agent (A3) containing a polycarbodiimide resin having a plurality of carbodiimide groups, and a hydrophilic solvent (B); and a second treatment agent containing a resorcin, formaldehyde and a latex, and/or a third treatment agent containing a rubber.

Advantageous Effects of Invention

In the present invention, since an untreated yarn of a cord for a power transmission belt is treated with a first treatment agent containing a rubber composition (A) containing a condensate (A1) of a resorcin and formaldehyde, a rubber component (A2) containing a carboxy-modified latex and a curing agent (A3) containing a polycarbodiimide resin having a plurality of carbodiimide groups, and a hydrophilic solvent (B), firm adhesion between fibers is achieved even in a twisted yarn cord while maintaining bending fatigue resistance (flexibility), and fraying resistance can be improved. In addition, since the condensate (A1) of a resorcin and formaldehyde, the rubber component (A2) containing a carboxy-modified latex, and the curing agent (A3) containing a polycarbodiimide resin having a plurality of carbodiimide groups are combined and blended with a hydrophilic solvent, a small load is imposed to the environment and adhesiveness to rubber in which the cord is embedded can be improved.

MODES FOR CARRYING OUT THE INVENTION

<Method for Manufacturing Cord for Power Transmission Belt>

In the method for manufacturing of a cord for a power transmission belt of the present invention, the cord is manufactured by at least undergoing a step (first treatment step) of treating (coating treatment, immersion treatment, impregnation treatment, drying treatment, curing treatment) an untreated yarn (tension member main body) of a cord for a power transmission belt with a specific first treatment agent.

[First Treatment Step]

(Untreated Yarn of Cord for Power Transmission Belt)

Examples of a raw material fiber constituting the untreated yarn to be treated with the first treatment agent include natural fibers (cotton, hemp, etc.), regenerated fibers (rayon, acetate, etc.), synthetic fibers (polyolefin fibers such as polyethylene and polypropylene, styrene fibers such as polystyrene, fluorine fibers such as polytetrafluoroethylene, acrylic fibers, vinyl alcohol fibers such as polyvinyl alcohol, polyamide fibers, polyester fibers, whole aromatic polyester fibers, aramid fibers, etc.), inorganic fibers (carbon fibers, glass fibers, etc.), and the like. These fibers can be used alone or in combination of two or more thereof.

Among these fibers, from a viewpoint of high modulus, generally, use can be made of a synthetic fiber such as a polyester fiber having a $C_{2-4}$ alkylene arylate such as ethylene terephthalate and ethylene-2,6-naphthalate as a main constituent unit [polyalkylene arylate fibers such as polyethylene terephthalate fibers (PET fibers), polyethylene naphthalate fibers (PEN fibers), and polytrimethylene terephthalate fibers (PTT fibers)] and aramid fibers; and an inorganic fiber such as a carbon fiber. From a viewpoint of having high tensile strength, and responding to a demand of high tension and high load, an aramid fiber (an aromatic polyamide fiber) is preferably contained, and a para-aramid fiber is particularly preferable. Examples of the para-aramid fiber include polyparaphenylene terephthalamide fibers (e.g., "Twaron (registered trademark)" manufactured by Teijin Ltd., "Kevlar (registered trademark)" manufactured by Toray Du Pont Co., Ltd., etc.) and copolymer fibers of polyparaphenylene terephthalamide and 3,4'-oxydiphenylene terephthalamide (e.g., "Technora (registered trademark)" manufactured by Teijin Ltd., etc.).

The untreated yarn to be treated with the first treatment agent may be in a state of raw yarn with no twist being added, and may be in a state of twisted yarn (untreated twisted yarn cord) obtained by twist being added to raw yarn. The untreated twisted yarn cord has a characteristic in that filaments are twisted together, and thus it is difficult for a treatment agent to permeate between the filaments of the inside. For this reason, in the untreated twisted yarn cord, in general, a treatment agent cannot be firmly adhered to the filaments of the inside and adhesion with rubber easily deteriorates. On the other hand, there is a method of treating raw yarn with a treatment agent and adding twist thereto to prepare a twisted yarn cord, followed by a further treatment with a treatment agent. However, while fraying or adhesiveness is improved, alignment ability of filaments deteriorates and tensile strength or bending fatigue resistance easily deteriorates. In addition, since a treatment step is provided before and after twisting, the process is complicated, and when a treatment liquid is adhered to raw yarn, tackiness is increased to lower handling property during twist work. On the contrary, in the present invention, probably because permeability of a treatment agent is excellent, adhesion with rubber can be improved in a twisted yarn cord as well. For this reason, the present invention exhibits excellent effects in any of the cases where the untreated yarn of a cord for a power transmission belt is raw yarn or a twisted yarn cord, and is particularly effective in the case of untreated twisted yarn cord.

The untreated twisted yarn cord containing raw material fibers may be an untreated twisted yarn cord obtained by adding twist to multifilament yarn (raw yarn) containing raw material fibers (particularly, para-aramid fibers). In the present invention, since the treatment agent has excellent impregnating property into a twisted yarn cord (between monofilaments and/or between multifilaments) in such a twisted yarn cord as well, peeling resistance, fraying resistance, and adhesiveness to rubber can be improved.

Regarding raw yarn, the multifilament yarn preferably contains monofilament yarn of a para-aramid fiber, and if necessary, may also contain monofilament yarn of another fiber (a polyester fiber, etc.). A proportion of the para-aramid fiber is 50% by mass or more (particularly 80% to 100% by mass) based on the entirety of monofilament yarns (multifilament yarn), and in general, the entire monofilament yarns may be constituted by para-aramid fibers. In the present invention, since an untreated twisted yarn cord is treated with a specific first treatment agent, even in the case where the untreated twisted yarn cord is a multifilament yarn of para-aramid fibers (multifilament yarn only formed of monofilament yarns of para-aramid fibers), it is possible to prevent fraying on a lateral surface of a power transmission belt and to improve bending fatigue resistance of a power transmission belt.

The multifilament yarn only has to contain a plurality of monofilament yarns, and from a viewpoint of durability of a power transmission belt, may contain, for example, approximately 100 to 5,000, preferably 300 to 2,000, and more preferably 600 to 1,000 monofilament yarns.

The monofilament yarn may have an average fineness of, for example, approximately 0.8 to 10 dtex, preferably 0.8 to 5 dtex, and more preferably 1.1 to 1.7 dtex.

The twisted yarn cord may be a twisted yarn cord (single twisted yarn) obtained by applying right-twist (S twist) or left-twist (Z twist) to at least one piece of raw yarn, and from a viewpoint of strength, a twisted yarn cord obtained by twisting a plurality of raw yarns is preferable.

The twisted yarn cord obtained by twisting a plurality of raw yarns may be a twisted yarn cord obtained by second twisting a plurality of single twisted yarns as first twisted yarns (e.g., plied twisted yarn, piece twisted yarn, Lang twisted yarn, etc.), and may be a twisted yarn cord obtained by second twisting a single twisted yarn(s) and a single yarn(s) as first twisted yarns (e.g., wall twisted yarn, etc.). In addition, a single twist direction (first twist direction) and a second twist direction may be any of the same direction (Lang twist) and a reverse direction (plied twist). Among these, from a viewpoint of suppression of untwisting or excellent bending fatigue resistance, the twisted yarn cord twisted in two stages (plied twisted yarn or Lang twisted yarn), obtained by second twisting a plurality of single twisted yarns as first twisted yarns is particularly preferable.

The number of pieces of first twisted yarns constituting the twisted yarn cord may be, for example, approximately 2 to 5, preferably 2 to 4, and more preferably 2 to 3 pieces. The number of twist in the first twist may be, for example, approximately 20 to 300 times/m, preferably 30 to 200 times/m, and more preferably 50 to 180 times/m. In the first twist, a twist factor (T. F.) represented in Expression (1) can be selected from a range of approximately 0.01 to 10, and for example, it is preferably approximately 1 to 6 in the plied twisted yarn, and it is preferably approximately 0.2 to 2 in the Lang twisted yarn.

$$\text{Twist factor(T.F.)} = [\text{number of twist(times}/m) \times \sqrt{\text{total fineness}(tex)}]/960 \qquad (1)$$

A number of twist in the second twist is not particularly limited and may be, for example, approximately 30 to 200 times/m, preferably 40 to 180 times/m, and more preferably 50 to 150 times/m. In the second twist, the twist factor (T. F.) represented in Expression (1) can be selected from a range of approximately 0.01 to 10, and for example, it is preferably approximately 1 to 6 in the plied twisted yarn, and it is preferably approximately 2 to 5 in the Lang twisted yarn.

An average diameter of the second twisted untreated twisted yarn cord for a tension member for a power transmission belt may be, for example, approximately 0.2 to 3.5 mm, preferably 0.4 to 3 mm, and more preferably 0.5 to 2.5 mm.

When a twist constitution in a twisted yarn cord obtained by twisting a plurality of raw yarns is represented by (number of alignment of raw yarn(s) at the first twist)×(number of alignment of first twisted yarn(s) at the second twist), the twisted yarn cord may have a constitution of 1×2, 1×3, 1×5, 2×3, 2×5, 3×5, and the like.

(First Treatment Agent)

The first treatment agent (or pre-treatment agent) contains a rubber composition (A) containing a condensate (A1) of a resorcin and formaldehyde, a rubber component (A2) containing a carboxy-modified latex (carboxy group-containing latex or carboxy group-terminated latex) and a curing agent (A3) containing a polycarbodiimide resin having a plurality of carbodiimide groups, and a hydrophilic solvent (B).

(A1) Condensate of Resorcin and Formaldehyde (RF Condensate)

The first treatment agent contains a condensate (RF condensate) of a resorcin (R) and formaldehyde (F) in order to mainly improve fraying resistance. The RF condensate is excellent in compatibility with a carboxy-modified latex, and can form a coating film providing both flexibility and fraying resistance.

The RF condensate (A1) is not particularly limited, and examples thereof include novolak types, resol types, and combinations thereof.

The RF condensate may be, for example, a reaction product (e.g., an initial condensate or prepolymer) obtained by reacting a resorcin and formaldehyde in the presence of water and a base catalyst (alkali metal salt such as sodium hydroxide; alkaline earth metal salt; ammonia, etc.). As long as the effect of the present invention is not inhibited, along with a resorcin, an aromatic monool such as phenol and cresol may be used, and an aromatic diol or polyol such as catechol and hydroquinone may be used. In addition, as the formaldehyde, a condensation product of formaldehyde (e.g., trioxane, paraformaldehyde, etc.) may be used, and an aqueous solution of formaldehyde (formalin, etc.) may be used.

A ratio (use ratio) of resorcin and formaldehyde can be selected from a range of, for example, the former/the latter (molar ratio) of approximately 1/0.1 to ⅕. In the case of generating a mixture of the resol type and the novolak type, the molar ratio of the two may be, for example, the former/the latter being approximately 1/0.3 to 1/1, preferably 1/0.4 to 1/0.95, and more preferably 1/0.5 to 1/0.9. In the case where the proportion of formaldehyde is excessively large, there is a concern of contamination due to residual formaldehyde, and in the case of excessively small, on the contrary, there is a concern that the content of the resol type RF condensate becomes insufficient and mechanical characteristics of a cured product deteriorate.

The proportion of the RF condensate (A1) is, for example, approximately 1 to 100 parts by mass, preferably 3 to 80 parts by mass (e.g., 5 to 50 parts by mass), and more preferably 10 to 40 parts by mass (particularly 20 to 30 parts by mass) relative to 100 parts by mass of the rubber component (A2). In the case where the proportion of the RF condensate is within the range with respect to the flexible rubber component, permeability of the treatment agent between fibers can be increased and flexibility can also be secured, and thereby a balance between firm adhesion (fraying resistance) and flexibility (bending fatigue resistance) of aramid fibers can be adjusted. On the contrary, in the case where the proportion of the RF condensate (A1) is excessively large, there is a concern that a cured product to be generated easily becomes rigid and thus bending fatigue resistance deteriorates. On the other hand, in the case where the proportion of the RF condensate (A1) is excessively small, there is a concern than mechanical characteristics of the cured product deteriorate and thus fraying resistance deteriorates.

(A2) Rubber Component

The rubber component (A2) contains a carboxy-modified latex. In the present invention, since a carboxy-modified latex is used as a rubber component, strength of a coating film formed by the first treatment agent can be improved, and bending fatigue resistance can be also secured due to flexibility of the latex.

The latex (rubber component) constituting the carboxy-modified latex is not particularly limited, and examples thereof include diene rubbers [natural rubbers, isoprene rubber, butadiene rubber, chloroprene rubber, styrene butadiene rubber (SBR latex), styrene-butadiene-vinylpyridine terpolymer latex (VP latex), acrylonitrile butadiene rubber (NBR latex), hydrogenated nitrile rubber (H-NBR latex), etc.], olefin rubbers (e.g., ethylene-α-olefin elastomers, ethylene-propylene copolymers (EPM), ethylene-propylene-diene terpolymers (EPDM), etc.), acrylic rubbers, fluorine rubbers, silicone rubbers, urethane rubbers, epichlorohydrin rubbers, chlorosulfonated polyethylenes (CSM), alkylchlorosulfonated polyethylenes (ACSM), and olefin-vinylester copolymers (e.g., ethylene-vinylacetate copolymer (EAM), etc.). These latexes (rubber) can be used alone or in combination of two or more thereof.

Among these, a diene rubber, a chlorosulfonated polyethylene rubber, an epichlorohydrin rubber, and the like are generally used. From a viewpoint of excellent adhesiveness to rubber, the NBR latex is preferable, and from a viewpoint of excellent adhesiveness to the RF condensate (A1) or to a second treatment agent containing a resorcin, formaldehyde and a latex, diene rubber having a vinylpyridine skeleton is preferable.

The NBR latex may contain a conventional copolymerizable component [e.g., a vinyl compound such as methacrylonitrile, (meth)acrylic acid and 2-methyl-5-vinylpyridine, a diene compound such as isoprene, methyl butadiene and pentadiene, etc.], in addition to acrylonitrile and butadiene which are polymerization components. The content (center value) of acrylonitrile in the NBR latex is, for example, approximately 10% to 50% by mass, preferably 20% to 45% by mass, and more preferably 30% to 43% by mass. In the case where the content of acrylonitrile is excessively small, there is a concern that the strength deteriorates, and in the case where the content of acrylonitrile is excessively large, there is a concern that cross-linking becomes difficult and durability deteriorates.

The diene rubber having a vinylpyridine skeleton may contain a conventional copolymerizable component [styrene, α-methylstyrene, chlorostyrene, (meth)acrylonitrile, (meth)acrylic acid, alkyl (meth)acrylate, etc.], in addition to butadiene and vinylpyridine. Among these, an aromatic vinyl monomer such as styrene is generally used. That is, as a vinylpyridine-butadiene copolymer, for example, a butadiene-vinylpyridine copolymer, a styrene-butadiene-vinylpyridine terpolymer (VP latex), and the like are generally used.

A method for introducing a carboxy group to the latex is not particularly limited, and in general, a method of performing a copolymerization with an unsaturated carboxylic acid having an ethylenically unsaturated bond is used. Examples of the unsaturated carboxylic acid include unsaturated monocarboxylic acids such as (meth)acrylic acid and crotonic acid; unsaturated polyvalent carboxylic acids such as fumaric acid, maleic acid, itaconic acid, and butene tricarboxylic acid; and partially esterified products of an unsaturated polyvalent carboxylic acid such as monoethyl maleate and monomethyl itaconate. These unsaturated carboxylic acids can be used alone or in combination of two or more thereof.

Specific examples of a carboxy-modified latex include carboxy-modified acrylonitrile-butadiene copolymer latexes (XNBR latexes), carboxy-modified hydrogenated acrylonitrile-butadiene copolymer latexes (XHNBR latexes), carboxy-modified styrene-butadiene copolymer latexes (XSBR latexes), and carboxy-modified styrene-butadiene-vinylpyridine copolymer latexes (XVP latexes). These carboxy-modified latexes can be used alone or in combination of two or more thereof. Among these, the XNBR latex and the XVP latex are preferable.

The rubber component may include a carboxy group-noncontaining latex (unmodified latex) unmodified by a carboxy group, in addition to the carboxy-modified latex (carboxy group-containing latex). Examples of the unmodified latex includes latexes exemplified as a latex constituting the carboxy-modified latex. A proportion of the unmodified latex is approximately 50% by mass or less, preferably 30% by mass or less (e.g., 0.1% to 30% by mass), and more preferably 10% by mass or less (e.g., 1% to 10% by mass), based on the entirety of the rubber component.

A proportion of the carboxy-modified latex may be 50% by mass or more, preferably 70% by mass or more, and more preferably 90% by mass or more, based on the entirety of the rubber component (A2), and the rubber component (A2) may be composed of the carboxy-modified latex alone (100% by mass). In the case where the proportion of the carboxy-modified latex is excessively small, there is a concern that the strength of a coating film formed by the first treatment agent deteriorates.

(A3) Curing Agent

The curing agent (A3) contains a polycarbodiimide resin having a plurality of carbodiimide groups. In the present invention, since the polycarbodiimide resin is used as a curing agent, a latex can be cross-linked and reinforced due to cross-linking reaction between a carboxy group of a latex and a carbodiimide group, and a generated coating film can be strengthened. In addition, the following chemical structural adhesions (chemical bond or intermolecular interaction) act between the polycarbodiimide resin and the aramid fiber, and the aramid fiber can be more firmly adhered.

(1) Chemical adhesion in which a carbodiimide group of the polycarbodiimide resin chemically reacts with a residual amino group and/or carboxy group of the aramid fiber to form a bond; and (2) Chemical adhesion due to intermolecular interaction (hydrogen bonding) between a carbodiimide group of the polycarbodiimide resin and an amide bond of the aramid fiber.

The polycarbodiimide resin only has to have a plurality of carbodiimide groups (—N=C=N—), and is not particularly limited. Examples thereof include resins (or oligomers) having a repeating unit represented by Formula (I).

—(N=C=N—R)—    (I)

(In the formula, R represents a divalent hydrocarbon group which may have a substituent)

In R of Formula (I), the divalent hydrocarbon group includes an aliphatic hydrocarbon group, an alicyclic hydrocarbon group, an aromatic hydrocarbon group, and the like.

Examples of the aliphatic hydrocarbon group include alkylene groups, alkenylene groups, and alkynylene groups. Examples of the alkylene group include $C_{1-20}$ alkylene groups such as methylene group, ethylene group, propylene group, trimethylene group, butylene group, tetramethylene group, hexamethylene group, isohexylene group, octamethylene group, isooctylene group, decamethylene group, and dodecamethylene group, and the like. Examples of the alkenylene group include $C_{2-20}$ alkenylene groups such as vinylene group, allylene group, metallylene group, 1-propenylene group, isopropenylene group, butenylene group, pentenylene group, and hexenylene group, and the like. Examples of the alkynylene group include $C_{2-20}$ alkynylene groups such as ethynylene group and propynylene group, and the like.

Examples of the alicyclic hydrocarbon group include $C_{3-12}$ cycloalkylene groups such as cyclopropylene group, cyclobutylene group, cyclopentylene group, cyclohexylene group, and cyclododecane-diyl group; $C_{3-12}$ cycloalkenylene groups such as cyclohexenylene group; $C_{4-15}$ cross-linked cyclic hydrocarbon groups such as bicycloheptanylene group and bicycloheptenylene group, and the like.

Examples of the aromatic hydrocarbon group include $C_{6-14}$ arylene groups such as phenylene group and naphthylene group, and the like.

In addition, the hydrocarbon group may be, for example, a group obtained by bonding two or more selected from an aliphatic hydrocarbon group, an alicyclic hydrocarbon group and an aromatic hydrocarbon group. Examples of a group obtained by bonding an aliphatic hydrocarbon group and an alicyclic hydrocarbon group include dicycloalkyl alkane-diyl groups such as cyclohexylene methylene group, methylene cyclohexylene group, dicyclohexylmethane-4,4'-diyl group, and dicyclohexylpropane-4,4'-diyl group, and the like. Examples of a group obtained by bonding an aliphatic hydrocarbon group and an aromatic hydrocarbon group include diaryl alkane-diyl groups such as tolylene group, xylylene group, diphenylmethane-4,4'-diyl group, and diphenylpropane-4,4'-diyl group, and the like.

Among these hydrocarbon groups, a $C_{1-10}$ alkylene group such as a methylene group and a hexamethylene group, a $C_{5-8}$ cycloalkylene group such as a cyclohexylene group, a $C_{6-10}$ arylene group such as a phenylene group, and a combination of these hydrocarbon groups (e.g., combination of $C_{1-10}$ alkylene group such as a dicyclohexylmethane-4,4'-diyl group and a $C_{5-8}$ cycloalkylene group) are preferable.

Examples of a substituent of the hydrocarbon groups include alkyl groups ($C_{1-10}$ alkyl groups such as methyl group, ethyl group, propyl group, isopropyl group, and butyl group), alkenyl groups, cycloalkyl groups, aryl groups, halogen atoms (fluorine atom, chlorine atom, bromine atom, iodine atom, etc.), oxo group, hydroxy group, carbonyl group, carboxy group, amino group, alkoxy groups ($C_{1-6}$ alkoxy groups such as methoxy group and ethoxy group, etc.), acyl group, mercapto group, sulfonic acid (salt) group, alkylthio groups, epoxy group, cyano group, phosphate group, and the like. These substituents can be used alone or in combination of two or more thereof. Among these substituents, a $C_{1-4}$ alkyl group such as an isopropyl group, or a hydrophilic group such as a hydroxy group, a carboxy group, an amino group, and a sulfonic acid (salt) group, and the like are generally used.

The polycarbodiimide resin may be a homopolymer in which the group R's constituting the repeating unit are uniform hydrocarbon groups, and may be a copolymer in which the group R's are different.

The polycarbodiimide resin is preferably a resin that can form micelles in the first treatment agent containing a hydrophilic solvent (B) (particularly water).

Since the polycarbodiimide resin is generally manufactured by condensation of an isocyanate compound, a terminal group of the polycarbodiimide resin may be an isocyanate group, and may also be a group in which at least a portion of the isocyanate group is blocked by a blocking agent. The blocking agent only has to be a compound (amine, alcohol, etc.) having a reactive group with an isocyanate group, and from a viewpoint of imparting hydrophilicity to the polycarbodiimide resin, a blocking agent having a hydrophilic group is preferable. Examples of the blocking agent include di $C_{1-4}$ alkyl amino $C_{1-4}$ alkanols such as dimethylaminoethanol, di $C_{1-4}$ alkyl amino $C_{1-4}$ alkyl amines such as dimethylaminopropylamine, hydroxy $C_{1-4}$ alkane sulfonates such as sodium hydroxy propane sulfonate, and $C_{2-4}$ alkylene glycol mono $C_{1-4}$ alkyl ethers such as ethylene glycol monoethyl ether, and the like.

Among these polycarbodiimide resins, an aqueous (water-soluble or water dispersible) polycarbodiimide resin is preferable from a viewpoint of having excellent dispersibility in the first treatment agent containing a hydrophilic solvent (B) (particularly water) and capable of forming micelles. As for the aqueous polycarbodiimide resin, the repeating unit may have the hydrophilic group, or the terminal group may be blocked by a hydrophilic group. From a viewpoint of having excellent reactivity with a carbodiimide group and the like, it may be a polycarbodiimide resin in which the terminal group is blocked by a hydrophilic group. In the case where an aqueous polycarbodiimide resin is used as the polycarbodiimide resin, the aqueous polycarbodiimide resin can form micelles in the treatment agent, whereby reactivity of a carbodiimide group can be inhibited in a hydrophilic solvent (particularly water), but the reactivity can be restored by drying to function as a cross-linking agent.

In addition, even if the polycarbodiimide resin is a resin having no hydrophilic group, the polycarbodiimide resin can form micelles in the first treatment agent by being combined with a surfactant. As the surfactant, a conventional anionic surfactant, cationic surfactant, nonionic surfactant, and amphoteric surfactant can be used.

The polycarbodiimide resin preferably has carbodiimide groups in molecules at a predetermined ratio from a viewpoint of enhancing the reactivity with a carboxy group of a carboxy-modified latex and efficiently cross-linking the carboxy-modified latex. Specifically, the polycarbodiimide resin may have a chemical formula weight (NCN equivalent) per mole of a carbodiimide group being approximately 600 or less, for example, 200 to 600, preferably 250 to 500, and more preferably 300 to 450 (particularly 350 to 450). In the case where the NCN equivalent is excessively large, there is a concern that the reactivity with a carboxy-modified latex deteriorates.

A degree of polymerization of the polycarbodiimide resin only has to be, for example, 2 or more, and is, for example, approximately 2 to 100, preferably 3 to 50, and more preferably 5 to 30 (particularly 6 to 10).

As the polycarbodiimide resin, a commercially available polycarbodiimide resin can be used. For example, "Carbodilite (registered trademark)" series (E-02, E-03A, E-05, etc.) manufactured by Nisshinbo Chemical, Inc., which are commercially available as a cross-linking agent for an aqueous resin, can be used.

The curing agent (A3) may include another conventional curing agent within a range of not impairing the effects of the present invention. The other curing agents only have to have a plurality of groups reactable with a carboxy group, and examples thereof include polyisocyanates, polyols, polyamines, and the like. Among these, from a viewpoint of excellent permeability of a treatment agent between fibers, a blocked isocyanate (blocked polyisocyanate) which is a compound obtained by masking an isocyanate group(s) of a polyisocyanate with a blocking agent(s) to suppress reaction is preferable. As the blocked isocyanate, conventional blocked isocyanates can be used, and an aliphatic polyisocyanate or a derivative thereof [e.g., hexamethylene diisocyanate (HDI) or trimer thereof], an aromatic polyisocyanate [tolylene diisocyanate (TDI), xylylene diisocyanate (XDI), etc.], and the like are generally used. As the blocking agent (protecting agent), for example, oximes and lactams are generally used. A dissociation temperature of the blocked isocyanate only has to exceed a temperature (ordinary temperature) in an immersion treatment with the first treatment agent and be a heat treatment temperature after the immersion treatment or lower, and, for example, is approximately 80° C. to 220° C., preferably 100° C. to 200° C., and more preferably 120° C. to 180° C. A proportion of the blocked isocyanate may be 1,000 parts by mass or less, for example, approximately 10 to 500 parts by mass, preferably 30 to 300 parts by mass, and more preferably 50 to 200 parts by mass relative to 100 parts by mass of the polycarbodiimide resin. In the case where the proportion of the blocked isocyanate is excessively large, there is a concern that fraying resistance deteriorates.

The proportion of the polycarbodiimide resin is, for example, 10% by mass or more, preferably 50% by mass or more, and more preferably 80% by mass or more (particularly 90% by mass or more) based on the entirety of the curing agent (A3), and may be 100% by mass (only polycarbodiimide resin).

A proportion of the curing agent (A3) (particularly polycarbodiimide resin) can be selected from a range of approximately 0.1 to 20 parts by mass relative to 100 parts by mass of the rubber component (A2) (particularly carboxy-modified latex), and, from a viewpoint of easily causing a reaction between the carboxy group of the carboxy-modified latex and the curing agent (particularly polycarbodiimide resin) and efficiently cross-linking the carboxy-modified latex, it is, for example, approximately 0.5 to 15 parts by mass (e.g., 0.8 to 12 parts by mass), preferably 1 to 10 parts by mass (e.g., 2 to 8 parts by mass), and more preferably 3 to 10 parts by mass (particularly 3 to 8 parts by mass). In the case where the proportion of the curing agent is excessively small, there is a concern that adhesive force between fibers deteriorates and thus fraying resistance deteriorates, and in the case of excessively large, there is a concern that fraying resistance and bending fatigue resistance (flexibility) deteriorate.

The rubber composition (A) may contain a conventional additive, for example, a reactive binder resin (an epoxy compound, etc.), an organic solvent (a reactive diluent such as a monocarbodiimide compound, etc.), a curing accelerator, an adhesiveness improving agent, a filler, an antioxidant, a lubricant, a tackifier, a stabilizer, a coupling agent, a plasticizer, a lubricant, a coloring agent, and the like, within a range of not impairing the effects of the present invention. A proportion of the conventional additive may be 30% by mass or less based on the entirety of the first treatment agent, and is, for example, approximately 0.01% to 30% by mass, preferably 0.05% to 20% by mass, and more preferably 0.1% to 10% by mass.

(B) Hydrophilic Solvent

In the present invention, since the solvent of the first treatment agent is the hydrophilic solvent (B), load to the environment is small as compared to the case of a hydrophobic solvent. Examples of the hydrophilic solvent (B) include water, lower aliphatic alcohols (e.g., $C_{1-4}$ alkylalcohols such as ethanol and isopropanol, etc.), alkylene glycols (e.g., ethylene glycol, diethylene glycol, propylene glycol, etc.), ketones (acetone, etc.), and the like. These hydrophilic solvents can be used alone or in combination of two or more thereof. Among these, a hydrophilic solvent containing water is preferable, and water alone is particularly preferable.

A proportion (concentration of the total solid content) of the rubber composition (A) in the first treatment agent can be selected from a range of approximately 1% to 50% by mass, and particularly, in the case where the untreated yarn is a twisted yarn cord, from a viewpoint that the first treatment agent can permeate between fibers (filaments) inside the twisted yarn to improve fraying resistance, the proportion is, for example, approximately 2% to 30% by mass, preferably 5% to 28% by mass, and more preferably 10% to 25% by mass (particularly 15% to 20% by mass). In the case where the proportion of the rubber composition (A) is excessively small, there is a concern that firm adhesion between the fibers cannot be achieved and fraying of a tension member occurs, and in the case of excessively large, there is a concern that lumps of the solid content generate on a surface of the tension member after treatment.

A peeling force (adhesion force) between an aramid cord and rubber is strong if the peeling mode is a damage in a rubber portion, and the peeling force (adhesion force) is weak if peeling is caused by a damage between fibers or cutting of the fibers, or peeling is caused by a damage in a coating film. In the case where such a first treatment agent is used, the peeling mode becomes a damage in a rubber portion, and thus it is possible to improve adhesiveness between the aramid cord and the rubber composition.

(Treatment Method)

A method for preparing the first treatment agent is not particularly limited, and, for example, it may be prepared by stirring and mixing at once, or may be prepared by dividedly stirring and mixing.

A method for treating an untreated yarn of a cord for a power transmission belt with the first treatment agent is not particularly limited, and spraying, coating, immersion, and the like can be exemplified. Among these treatment methods, immersion is generally used. The immersion time may be, for example, approximately 1 to 20 seconds, and preferably 2 to 15 seconds.

After treating an untreated yarn of a cord for a power transmission belt with a first treatment agent, drying may be performed if necessary. The drying temperature may be, for example, approximately 100° C. to 250° C., preferably 130° C. to 240° C., and more preferably 150° C. to 230° C. (particularly 180° C. to 220° C.). The drying time may be, for example, approximately 10 seconds to 30 minutes, preferably 30 seconds to 10 minutes, and more preferably 1 to 5 minutes. In addition, drying may be performed while applying tension against the untreated yarn of a cord for a power transmission belt. The tension may be, for example, approximately 5 to 15 N, and preferably 10 to 15 N. If drying is performed while applying tension, the treatment agent settles to the untreated yarn of a cord for a power transmission belt, and thus twist irregularities can be reduced and fluctuations in the diameter of a twisted yarn cord generated due to the twist irregularities can be decreased.

An average thickness of a coating film formed by the first treatment agent can be selected from a range of, for example, approximately 0.001 to 20 µm, and is, for example, approximately 0.05 to 18 µm, preferably 0.1 to 15 µm, and more preferably 1 to 12 µm (particularly 5 to 10 µm). In the case where the thickness is excessively thin, there is a concern that peeling adhesion strength between the aramid cord and the rubber deteriorates, and in the case of excessively thick, there is a concern that shear adhesion strength between the aramid cord and the rubber deteriorates. In the present invention, the thickness of the coating film can be measured by a method using a scanning type electron microscope. Specifically, the thickness can be measured by observing a cross-section of the treated cord of the aramid cord treated with the treatment agent by using a scanning type electron microscope, measuring thicknesses of the coating film at arbitrary 10 points, and then acquiring an average value thereof.

[Second Treatment Step]

The first treated yarn treated with the first treatment agent may be used as a cord for a power transmission belt as it is, and in general, may be further treated with a second treatment agent containing a resorcin, formaldehyde, and a latex. By undergoing the step (second treatment step) of performing treatment with such a second treatment agent, adhesiveness between the cord for a power transmission belt and a power transmission belt main body can be further improved.

The second treatment agent (an unvulcanized rubber composition or RFL liquid) contains a resorcin (R), formaldehyde (F), and rubber or a latex (L). The resorcin (R) and formaldehyde (F) may be contained in a form of a condensate (RF condensate) thereof. Particularly, in the case where the first treated yarn is a twisted yarn cord, the second treatment agent forms a coating film on the coating film of the first treatment agent and improves convergence of the twisted yarn cord. In addition, the coating film formed by the second treatment agent is also firmly adhered to a coating film formed by a third treatment agent and thus, the coating films formed by the first to third treatment agents can be firmly integrated.

As the RF condensate, the RF condensate exemplified in the section of the first treatment agent can be used.

The rubber constituting the latex is not particularly limited as long as it can impart flexibility to the aramid cord, and examples thereof include diene rubbers [e.g., natural rubbers, isoprene rubber, butadiene rubber, chloroprene rubber, styrene butadiene rubber, vinylpyridine-styrene-butadiene copolymer rubber, acrylonitrile butadiene rubber (nitrile rubber), a hydrogenated product of these diene rubber, etc.], olefin rubbers [e.g., ethylene-$\alpha$-olefin rubbers (ethylene-$\alpha$-olefin elastomers), polyoctenylene rubber, ethylene-vinyl acetate copolymer rubbers, chlorosulfonated polyethylene rubbers, alkylated chlorosulfonated polyethylene rubbers, etc.], acrylic rubbers, silicone rubbers, urethane rubbers, epichlorohydrin rubbers, fluorine rubbers, and combinations thereof.

The rubber constituting the latex can be appropriately selected depending on the type of the latex of the first treatment agent (e.g., the carboxy-modified latex or unmodified latex), the type of the rubber of the third treatment agent to be described below, or the like, and for example, rubber which is the same as or belongs to the same group of these rubbers can be preferably used. Particularly, rubber which is the same as or belongs to the same group of the carboxy-modified latex of the first treatment agent (particularly the same rubber as the carboxy-modified latex of the first treatment agent) can be particularly preferably used.

A proportion of the latex can be selected from a range of approximately 40 to 700 parts by mass relative to 100 parts by mass of the RF condensate, in terms of the solid content, and for example, it may be approximately 50 to 600 parts by mass, preferably 100 to 550 parts by mass, and more preferably 200 to 500 parts by mass (particularly 300 to 450 parts by mass).

The second treatment agent generally contains water in many cases. In addition, the second treatment agent may contain a reactive binder resin (an epoxy compound, etc.) or an additive exemplified in the section of the third treatment agent (e.g., a vulcanizing agent, a vulcanization accelerator, a covulcanizing agent, an adhesiveness improving agent, a filler, an anti-oxidant, a lubricant, etc.), if necessary.

A concentration of the total solid content of the second treatment agent (concentration obtained by dividing a sum total mass of the solid content mass of the RF condensate and the solid content mass of the latex by the mass of the treatment agent) may be, for example, approximately 0.1% to 20% by mass, preferably 0.5% to 15% by mass (e.g., 1% to 11% by mass), and more preferably 1.5% to 10% by mass (particularly 2% to 10% by mass). Such proportion can make easy the adjustment of a solid content adhered amount to the first treated yarn within an appropriate range, and the efficient improvement on the characteristics of the cord for a power transmission belt.

A method for performing treatment with the second treatment agent is the same as the method for performing treatment with the first treatment agent. A preferable drying temperature may be approximately 150° C. to 250° C. (particularly 200° C. to 240° C.).

An average thickness of a coating film formed by the second treatment agent may be, for example, approximately 0.05 to 30 μm, and preferably 0.1 to 5 μm.

[Third Treatment Step]

The second treated yarn of a cord for a power transmission belt, treated with the second treatment agent may be treated with the third treatment agent containing rubber (unvulcanized rubber composition or rubber gum). By undergoing the step (third treatment step) of performing treatment with such a third treatment agent, since the coating film formed by the third treatment agent is firmly adhered with the rubber portion of the power transmission belt, adhesiveness between the cord for a power transmission belt (particularly aramid cord) and the power transmission belt main body (particularly adhesion rubber layer) can be further improved.

The first treated yarn of the cord for a power transmission belt, treated in the first treatment step may be treated with the third treatment agent containing rubber without undergoing the second treatment step. In this case, in addition to the above-described effect of the third treatment agent, the rubber component contained in the third treatment agent can be vulcanization-adhered to the rubber component in the latex in the first treatment agent, and thus can be firmly integrated with the coating film formed by the first treatment agent. In addition, since it is possible to improve the adhesiveness without undergoing the second treatment step, convenience (productivity of the cord) is excellent.

The rubber can be appropriately selected depending on the types of the rubber contained in the first treatment agent and the second treatment agent, on the types of the rubber of the rubber layer embedding the cord (particularly aramid cord) in the power transmission belt, and the like, and the examples thereof include the rubbers exemplified in the section of the second treatment agent, such as olefin rubbers (e.g., ethylene-$\alpha$-olefin elastomers (or ethylene-$\alpha$-olefin rubbers, ethylene-propylene-diene rubbers (EPDM), etc.), chlorosulfonated polyethylene rubbers, alkylated chlorosulfonated polyethylene rubbers, etc.), and diene rubbers (e.g., chloroprene rubber, nitrile rubber, hydrogenated nitrile rubber, etc.). The rubber can be used alone or in combination of two or more.

As the rubber, rubber which is the same as or belongs to the same group of rubber embedding the cord can be preferably used.

The third treatment agent may contain, in addition to rubber, a conventional additive, for example, a vulcanizing agent (or cross-linking agent), a covulcanizing agent (or co-cross-linking agent), a vulcanization accelerator (or cross-linking aid), a vulcanization retardant, an adhesiveness improving agent, a filler, an anti-oxidant, a tackifier, a stabilizer, a coupling agent, a plasticizer, a lubricant, a coloring agent, a solvent, and the like, if necessary. The additive can be used alone or in combination of two or more thereof. Among these additives, the vulcanizing agent, covulcanizing agent, vulcanization accelerator, adhesiveness improving agent, filler, anti-oxidant, lubricant, solvent, and the like are generally used.

Vulcanizing agents can be classified into a sulfur vulcanizing agent and a non-sulfur vulcanizing agent. Examples of the sulfur vulcanizing agent include sulfurs (e.g., powdered sulfur, precipitated sulfur, colloidal sulfur, insoluble sulfur, and high dispersive sulfur), sulfur compounds (e.g., sulfur chloride such as sulfur monochloride and sulfur dichloride), and the like.

Examples of the non-sulfur vulcanizing agent include organic peroxides [e.g., diacyl peroxides, peroxy esters, dialkyl peroxides (e.g., dicumyl peroxide, t-butyl cumyl peroxide, 1,1-di-butylperoxy-3,3,5-trimethylcyclohexane 2,5-dimethyl-2,5-di(t-butylperoxy)-hexane, 1,3-bis(t-butylperoxy-isopropyl) benzene, di-t-butylperoxide, etc.), etc.], oximes [e.g., quinone dioxime, etc.], maleimides [e.g., bismaleimide, phenyl maleimide, N,N'-m-phenylene bismaleimide, etc.], allyl esters [e.g., diallyl fumarate (DAF), diallyl phthalate (DAP), triallyl cyanurate (TAC), triallyl isocyanurate (TAIL), trimethallyl isocyanurate (TMAIC), etc.], (meth)acrylates [e.g., alkyl(meth)acrylates such as methyl(meth)acrylate; di- to tetra-(meth)acrylates of alkane di- to tetra-ols such as ethylene glycol di(meth)acrylate, etc.], and the like.

The vulcanizing agent can be used alone or in combination of two or more. A proportion of the vulcanizing agent may be, for example, approximately 30 parts by mass or less, preferably 0.01 to 20 parts by mass, and more preferably 0.1 to 15 parts by mass (particularly 0.5 to 10 parts by mass), relative to 100 parts by mass of rubber.

Examples of the covulcanizing agent include metal oxides such as zinc oxide, magnesium oxide, calcium oxide, barium oxide, iron oxide, copper oxide, titanium oxide, and aluminum oxide, and the like. The covulcanizing agent can be used alone or in combination of two or more. A proportion of the covulcanizing agent may be, for example, approximately 30 parts by mass or less, preferably 0.1 to 20 parts by mass, and more preferably 0.5 to 15 parts by mass (particularly, 1 to 10 parts by mass), relative to 100 parts by mass of rubber.

Examples of the vulcanization accelerator include thiuram accelerators (e.g., tetramethyl thiuram-monosulfide (TMTM), tetramethyl thiuram-disulfide (TMTD), tetraethyl thiuram-disulfide (TETD), tetrabutyl thiuram-disulfide (TBTD), dipentamethylene thiuram-tetrasulfide (DPTT), etc), thiazole accelerators (e.g., 2-mercaptobenzothiazole or salts thereof), sulfonamide accelerators (e.g., N-cyclohexyl-2-benzothiazyl sulfonamide, etc.), urea accelerators (e.g., ethylene thiourea, etc.), and combinations thereof.

A proportion of the vulcanization accelerator may be, for example, approximately 30 parts by mass or less, preferably 0.1 to 20 parts by mass, and more preferably 0.5 to 15 parts by mass (particularly 1 to 10 parts by mass), relative to 100 parts by mass of rubber.

Examples of the adhesiveness improving agent include the RF condensates exemplified in the section of the first treatment agent, condensates of a melamine and an aldehyde (e.g., melamine-formaldehyde condensates, hexa $C_{1-4}$ alkoxy methylol melamines, etc.), epoxy compounds (e.g., alkane tri- to hexa-ol polyglycidyl ethers, poly $C_{2-4}$ alkylene glycol diglycidyl ethers, $C_{6-8}$ polyalkane tri- to tetra-ol polyglycidyl ethers, etc.), isocyanate compounds (e.g., polymethylene polyphenylene polyisocyanate, etc.), and combinations thereof. As the adhesiveness improving agent, a commercially available adhesive such as "Chemlock 402" manufactured by Lord Corporation, may be used.

A proportion of the adhesiveness improving agent may be, for example, approximately 50 parts by mass or less, preferably 0.1 to 40 parts by mass, and more preferably 0.5 to 30 parts by mass (particularly, 1 to 20 parts by mass) relative to 100 parts by mass of rubber.

Examples of the filler (including a reinforcing agent) include organic or inorganic fillers such as powdered fillers [e.g., carbon blacks (e.g., furnace blacks such as SAF, ISAF, HAF, MAF, FEF, GPF, and SRF), silica (dry silica, wet silica), calcium carbonate, talc, etc.], fibrous fillers [e.g., short fibers such as a polyamide fiber, a glass fiber, and a carbon fiber], and combinations thereof. Among these fillers, the inorganic filler (e.g., a powdered filler such as a carbon black and silica) is generally used.

A proportion of the filler may be, for example, approximately 1 to 80 parts by mass, preferably 5 to 70 parts by mass, and more preferably 10 to 60 parts by mass, relative to 100 parts by mass of rubber.

Examples of the anti-oxidant include amine anti-oxidants [e.g., aromatic secondary amines (e.g., N-phenyl-1-naphthylamine, octylated diphenylamine, 4,4'-bis(α,α-dimethyl benzyl) diphenylamine, N,N'-diphenyl-p-phenylenediamine, N,N'-dinaphthyl-p-phenylenediamine, etc.), ketone-amine reaction products (e.g., 2,2,4-trimethyl-1,2-dihydroquinoline polymerization products, condensates of acetone and diphenylamine, condensates of acetone and N-phenyl-2-naphthylamine, etc.), etc.], phenol anti-oxidants [e.g., monophenols (e.g., 2,6-di-t-butyl-4-methylphenol, etc.), bisphenols (e.g., 2,2'-methylene bis(4-methyl-6-t-butylphenol), etc.), etc.], and combinations thereof.

A proportion of the anti-oxidant may be, for example, approximately 30 parts by mass or less, preferably 0.1 to 20 parts by mass, and more preferably 0.5 to 15 parts by mass (particularly, 1 to 10 parts by mass), relative to 100 parts by mass of rubber.

Examples of the lubricant include higher saturated fatty acids or salts thereof (e.g., stearic acid, stearic acid metal salts, etc.), waxes, paraffin, and combinations thereof. A proportion of the lubricant may be, for example, approximately 30 parts by mass or less, preferably 0.1 to 20 parts by mass, and more preferably 0.5 to 15 parts by mass (particularly, 1 to 10 parts by mass), relative to 100 parts by mass of rubber.

Examples of the solvent include hydrocarbons (e.g., aromatic hydrocarbons such as toluene and xylene), halogenated hydrocarbons (e.g., haloalkanes such as methylene chloride and chloroform), alcohols (alkanols such as ethanol, propanol, and isopropanol), ethers (e.g., cyclic ethers such as dioxane and tetrahydrofuran), esters (e.g., ethyl acetate), ketones (e.g., linear ketones such as acetone and methyl ethyl ketone and cyclic ketones such as cyclohexanone), cellosolves, carbitols, and the like. The solvent can be used alone or as a mixed solvent.

A proportion of the solvent may be, for example, approximately 0.5 to 50 parts by mass, and preferably 1 to 20 parts by mass relative to 1 part by mass of rubber.

Representative third treatment agents include a rubber gum obtained by dissolving a composition containing rubber, an RF condensate, and an additive (e.g., a vulcanizing agent, a covulcanizing agent, a vulcanization accelerator, an adhesiveness improving agent, a filler, an anti-oxidant, and a lubricant) to a solvent. A concentration of rubber to the rubber gum is not particularly limited, and for example, may be approximately 1% to 20% by mass, preferably 2% to 15% by mass, and more preferably 3% to 10% by mass.

A method for performing treatment with the third treatment agent is also the same as the method for performing treatment with the first treatment agent. A preferable drying temperature may be approximately 100° C. to 250° C. (particularly 150° C. to 200° C.).

An adhesion rate of the third treatment agent adhered to the third treated yarn of the cord for a power transmission belt treated with the first treatment agent (and second treatment agent, if necessary) and the third treatment agent [(mass after treatment with the third treatment agent−mass before treatment with the third treatment agent)/mass after treatment with the third treatment agent×100] may be, for example, approximately 1% to 20% by mass, and preferably 5% to 15% by mass.

An average thickness of a coating film formed by the third treatment agent is not particularly limited, and for example, may be approximately 1 to 20 μm, and preferably 5 to 15 μm.

<Cord for Transmission Belt>

The cord for a power transmission belt obtained by the manufacturing method of the present invention is a cord for a power transmission belt in which a rubber composition is imparted on the surface and between fibers by the manufacturing method. The cord contains a cured product of at least the carboxy-modified latex and the polycarbodiimide resin on the surface and between the fibers, and preferably further contains a cured product of the RFL liquid by having undergone the treatment with the second treatment agent, and particularly preferably further contains a rubber composition for overcoat by having undergone the treatment with the third treatment agent.

The cord obtained by the manufacturing method of the present invention is appropriate for use in a power transmission belt, and is generally used by being embedded in a rubber layer of the power transmission belt. The rubber layer can be appropriately selected depending on the use and the like of the power transmission belt. For example, in a wrapped V belt, an aramid cord may be embedded in rubber layer formed of rubber (or a composition thereof) such as a diene rubber (a natural rubber, styrene-butadiene rubber, chloroprene rubber, etc.) or an olefin rubber (EPDM, etc.).

The cord for a power transmission belt may be an aramid cord obtained by the above-mentioned manufacturing method. That is, the aramid cord for a power transmission belt may be an aramid multifilament yarn (e.g., twisted yarn cord) treated (e.g., coating or impregnation) with the first treatment agent (if further necessary, with the second treatment agent or the third treatment agent, or with the second treatment agent and the third treatment agent). Moreover, the aramid cord for a power transmission belt may be an aramid multifilament yarn vulcanized after being treated (e.g., coating or impregnation) with the first treatment agent (if further necessary, with the second treatment agent or the third treatment agent, or with the second treatment agent and the third treatment agent).

An average diameter of the cord for a power transmission belt may be, for example, approximately 0.3 to 3.6 mm, preferably 0.5 to 3.1 mm, and more preferably 0.6 to 2.7 mm.

<Power Transmission Belt>

A power transmission belt only has to contain the above-mentioned cord for a power transmission belt, and generally, is a power transmission belt provided with a rubber layer in which a cord(s) (tension member) for a power transmission belt (particularly a plurality of cords for a power transmission belt) is embedded along a longitudinal direction (or circumferential direction) of the belt in many cases. An interval between adjacent cords (helical pitch) may be, for example, approximately 0.5 to 3 mm, preferably 0.6 to 1.5 mm, and more preferably 0.7 to 1.3 mm.

A representative power transmission belt may be a power transmission belt which includes an adhesion rubber layer and a compression rubber layer on one surface of the adhesion rubber layer, and in which a tension member for a power transmission belt is embedded in the adhesion rubber layer. A tension rubber layer may be provided on the other surface of the adhesion rubber layer. In addition, a portion or the entirety of a belt main body formed of rubber layers of the power transmission belt (e.g., a surface of the tension rubber layer and/or the compression rubber layer) may be coated (or be laminated) with a reinforcing fabric.

Examples of such a power transmission belt include V belts such as wrapped V belts and raw-edge V belts, V-ribbed belts, flat belts, toothed belts, and the like.

Figure 1:
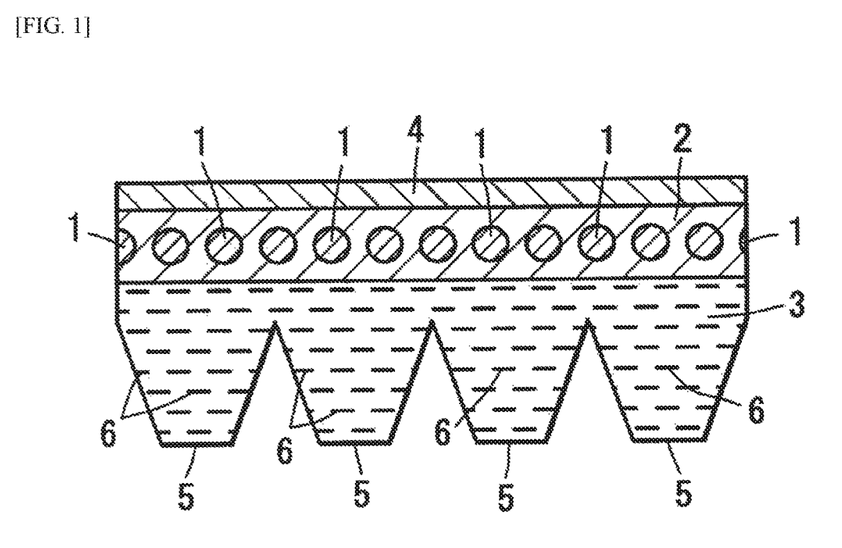
FIG. 1 is a schematic cross-sectional view illustrating an example of a power transmission belt containing a cord for a power transmission belt obtained by a manufacturing method of the present invention.

FIG. 1 is a schematic cross-sectional view illustrating a V-ribbed belt which is an example of a power transmission belt containing the cord (tension member) for a power transmission belt obtained by the manufacturing method of the present invention. In this example, there is provided an adhesion rubber layer 2 in which a cord (tension member) for a power transmission belt 1 is embedded in a longitudinal direction of the belt, a compression rubber layer 3 formed on one surface (inner circumferential surface) of the adhesion rubber layer, and an tension rubber layer 4 formed on the other surface (outer circumferential surface or back surface) of the adhesion rubber layer, and ribs 5 each of a V-shaped groove are formed in the compression rubber layer 3. In order to improve lateral pressure resistance of the power transmission belt, the compression rubber layer 3 contains a short fiber 6. In many cases, each of the adhesion rubber layer 2, compression rubber layer 3 and tension rubber layer 4 is formed of a rubber composition containing the rubber composition [olefin rubber (e.g., ethylene-α-olefin elastomer, etc.)] containing the same components as those contained in the third treatment agent, or the like. In addition, a reinforcing fabric formed of a woven fabric, a non-woven fabric, a knitted fabric, or the like may be laminated on the back surface of the tension rubber layer 4.

Figure 2:
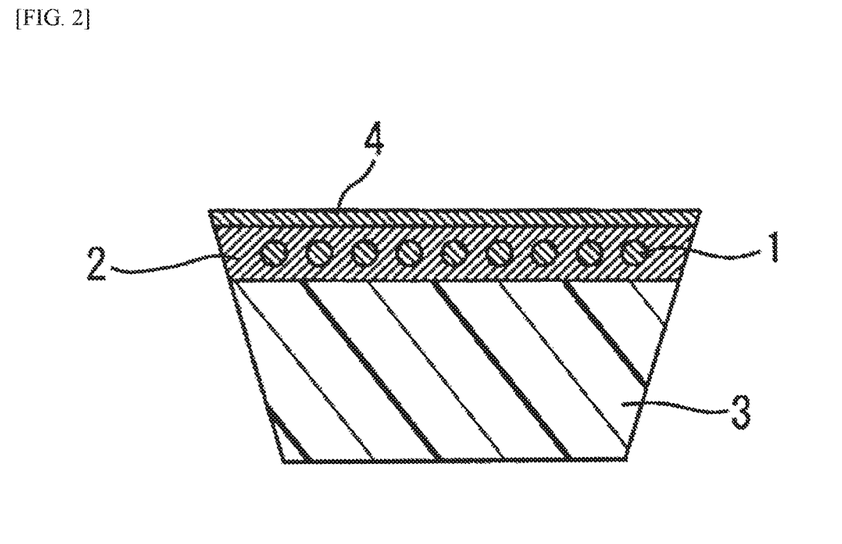
FIG. 2 is a schematic cross-sectional view illustrating another example of the power transmission belt containing a cord for a power transmission belt obtained by the manufacturing method of the present invention.

FIG. 2 is a schematic cross-sectional view illustrating a raw-edge V belt in another example of the power transmission belt containing the cord (tension member) for a power transmission belt obtained by the manufacturing method of the present invention. The belt illustrated in FIG. 2 is configured in the same manner as in the V-ribbed belt illustrated in FIG. 1, except for having no ribs 5 formed in the compression rubber layer 3 and being a trapezoidal shape in which a belt width decreases from the outer circumferential surface toward the inner circumferential surface. In addition, a plurality of cogs (projection portions) may be formed with a predetermined interval along the longitudinal direction of the belt in the compression rubber layer 3. Moreover, a reinforcing fabric formed of a woven fabric, a non-woven fabric, a knitted fabric, or the like may be laminated on a surface (inner circumferential surface) of the compression rubber layer 3 and a surface (outer circumferential surface) of the tension rubber layer 4.

These power transmission belts can be formed by sequentially winding a sheet for the compression rubber layer and a sheet for the first adhesion rubber layer on a cylindrical forming drum, spirally spinning the cord for a power transmission belt thereon, and sequentially winding a sheet for the second adhesion rubber layer and a sheet for the tension rubber layer to form a stacked body, vulcanizing the stacked body to prepare a vulcanized belt sleeve, and cutting the cylindrical vulcanized belt sleeve in a circumferential direction. At the time of the cutting, the cord for a power transmission belt arranged or oriented in the circumferential direction is also cut, and thus the cord for a power transmission belt is exposed to the lateral surface (cut surface) of the power transmission belt. If the cord for a power transmission belt is exposed to the lateral surface of the power transmission belt, there is a concern that yarn in the cord easily frays, and from the yarn frayed from the lateral surface of the power transmission belt, so-called "popping-out" occurs such that the cord for a power transmission belt projects from the lateral surface of the power transmission belt, and the cord for a power transmission belt popped out winds around an axis of a rotating pulley, to thereby break the power transmission belt. However, in the power transmission belts illustrated in FIG. 1 and FIG. 2, since the cord for a power transmission belt treated with a specific treatment agent(s) is embedded in the adhesion rubber layer, and filaments in the cord for a power transmission belt have high cohesion, the cord for a power transmission belt does not fray at the lateral surface of the power transmission belt, the popping-out of the cord for a power transmission belt can be effectively prevented from occurring, and durability of the power transmission belt and be significantly improved.

The power transmission belt is not limited to the V-ribbed belt and the raw-edge V belt, and can be also applicable to a toothed belt, a flat belt, and the like.

<Manufacturing Method of Power Transmission Belt>

The power transmission belt can be prepared by a conventional method, for example, by vulcanizing a cylindrical stacked body having a (cord) tension member for a power transmission belt treated with a specific treatment agent(s) interposed between a pair of unvulcanized rubber sheets (including an unvulcanized stacked body rubber sheet) to prepare a power transmission belt precursor (vulcanized belt sleeve), and cutting the cylindrical power transmission belt precursor in a circumferential direction. In the case where the cord for a power transmission belt obtained by the manufacturing method of the present invention is employed, even at the time of cutting in this manner, fluffing or fraying of the cord for a power transmission belt does not occur on the lateral surface of the power transmission belt. The pair of the unvulcanized rubber sheets may be the same or different from each other, and is formed of a rubber composition containing the components exemplified in the section of the third treatment agent in many cases.

EXAMPLES

Hereinafter, the present invention will be explained in detail based on examples, but the present invention is not limited to the examples.

[Raw Materials]
(Rubber Component)

Carboxy-modified NBR latex (COOH-modified NBR): "Nipol 1571CL" manufactured by Nippon Zeon Co., Ltd., 38% by mass of active component, high nitrile type Carboxy-modified styrene-butadiene-vinylpyridine copolymer latex (COOH-modified VP): "Nipol LX603" manufactured by Nippon Zeon Co., Ltd., 36% by mass of active component Unmodified NBR latex (unmodified NBR): "Nipol 1562" manufactured by Nippon Zeon Co., Ltd., 38% by mass of active component, moderate high nitrile type EPDM: "IP3640" manufactured by Dupont Dowelastomer Japan Ltd., Mooney viscosity of 40 (100° C.).

(RFL Liquid)

Table 1 shows constituent components of RFL liquid. First, to a container were added resorcin and water, stirred at room temperature (approximately 25° C.) for 10 minutes to dissolve them, and then thereto was further added 37% by mass of formalin, followed by stirring at room temperature for 10 minutes. After stirring, the resultant was aged at room temperature for 60 minutes to prepare an A liquid.

Subsequently, to another container was added a latex and thereto was further added water while stirring at room temperature to prepare a B liquid. After the addition of water, the A liquid was added while stirring the B liquid, followed by stirring at room temperature for 10 minutes. The mixed liquid was further aged at room temperature for 7 days to prepare an RFL liquid.

TABLE 1

| | | RFL-X | | RFL-Y | | RFL-Z | | RFL-W | |
|---|---|---|---|---|---|---|---|---|---|
| Blending agent (mass ratio) | | Blend amount | Solid content | Blend amount | Solid content | Blend amount | Solid content | Blend amount | Solid content |
| A liquid | Resorcin | 20 | 20 | 20 | 20 | 80 | 80 | 20 | 20 |
| | Water | 91.5 | — | 91.5 | — | 66 | — | 91.5 | — |
| | Formalin | 13.5 | 5 | 13.5 | 5 | 54 | 20 | 13.5 | 5 |
| B liquid | COOH-modified NBR | 263.2 | 100 | — | — | 263.2 | 100 | — | — |
| | COOH-modified VP | — | — | — | — | — | — | 277.8 | 100 |
| | Unmodified NBR | — | — | 263.2 | 100 | — | — | — | — |
| | Water | 236.8 | — | 236.8 | — | 236.8 | — | 222.2 | — |
| Sum total | | 625 | 125 | 625 | 125 | 700 | 200 | 625 | 125 |
| Total solid content concentration (% by mass) | | 20% | | 20% | | 28.6% | | 20% | |

(Curing Agent)

Polycarbodiimide dispersion liquid A: "Carbodilite E-02" manufactured by Nisshinbo Chemical Inc., 40% by mass of active component, NCN equivalent of 445

Polycarbodiimide dispersion liquid B: "Carbodilite E-05" manufactured by Nisshinbo Chemical Inc., 40% by mass of active component, NCN equivalent of 310

Blocked isocyanate dispersion liquid: "Elastron BN-27" manufactured by Dai-ichi Kogyo Seiyaku Co., Ltd., 30% by mass of active component, dissociation temperature of 180° C. or higher Water-soluble epoxy compound: "Denacol EX313" manufactured by Nagase Chemtex Corporation, liquid type, 100% by mass of active component (Third Treatment Agent and Additives of Rubber Composition for Adhesion Rubber Layer and Compression Rubber Layer)

HAF carbon black: "SEAST 3" manufactured by Tokai Carbon Co., Ltd.

Hydrous silica: "Nipsil VN3" manufactured by Tosoh Silica Co., Ltd., specific surface area of 240 m$^2$/g RF condensate: Resorcin-formaldehyde condensate of less than 20% of resorcinol and less than 0.1% of formalin Anti-oxidant: "NONFLEX OD3" manufactured by Seiko Chemical Co., Ltd.

Vulcanization accelerator MBTS: 2-mercaptothiazoline, dibenzothiazyl-disulfide

Vulcanization accelerator DM: di-2-benzothiazolyl disulfide

Paraffin oil: "Diana Process Oil" manufactured by Idemitsu Kosan Co., Ltd.

Polyamide short fiber: "66 Nylon" manufactured by Asahi Kasei Co., Ltd.

(Twisted Yarn Cord of Aramid Fiber)

A bundle (referred to as aramid fiber single yarn) of non-twisted ribbon-like aligned aramid fiber filaments made of aramid fibers ("Technora T-200" manufactured by Teijin Co., Ltd.) of 1,670 dtex (filament number of 1,000) was firstly twisted at a first twist number of 4 times/10 cm, and two pieces of the first twisted yarn were aligned and secondary twisted at a second twist number of 13 times/10 cm in the same direction as that of the first twist, thereby obtaining a twisted yarn cord of the Lang twist. Regarding the twisted yarn cord, both the S twist and the Z twist were prepared.

[Fraying Resistance]

Figure 3:
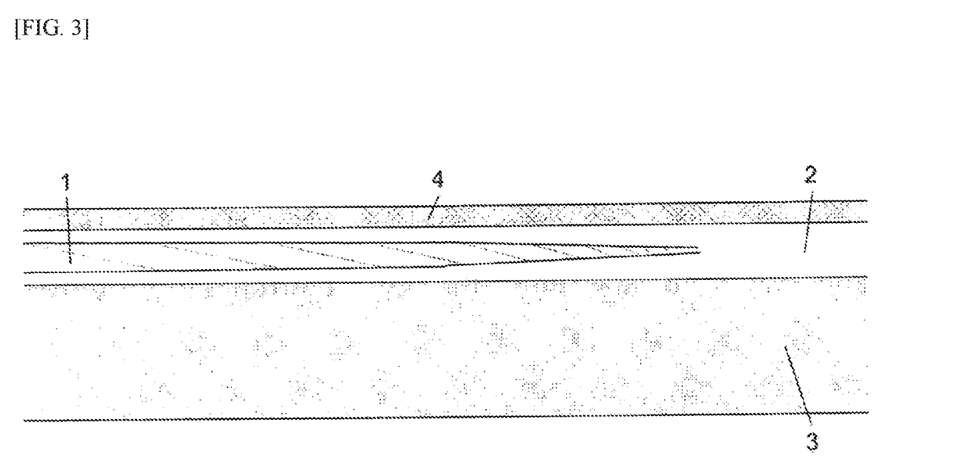
FIG. 3 is a schematic cross-sectional view of a belt cut for evaluating fraying resistance of V-ribbed belts obtained in Examples and Comparative Examples.

Regarding the V-ribbed belt prepared in Examples and Comparative Examples, the fraying state of the aramid cord exposed to the lateral surface of the belt cut by a cutter in a circumferential direction (longitudinal direction of the belt) was evaluated. That is, as illustrated in FIG. 3, in the V-ribbed belt provided with the adhesion rubber layer 2, the compression rubber layer 3 formed on the inner circumferential surface of the adhesion rubber layer, and the tension rubber layer 4 formed on the outer circumferential surface of the adhesion rubber layer, the aramid cord embedded in the adhesion rubber layer 2 was exposed by cutting, and the fraying state of the aramid cord was evaluated by the following criteria. Cases of the evaluation being "B" or more were determined at a good level acceptable as a product.

A: Fraying does not occur on an end surface when the belt is cut

B: Fraying slightly occurs on an end surface when the belt is cut (filaments are concentrated, not widely spread)

C: Fraying occurs on an end surface when the belt is cut (spread in a filament unit, widely as flowers bloom).

Particularly, the evaluation of "B" refers to fraying due to mainly extrinsic factors such as friction, and thus is determined at a level acceptable as a product. On the other hand, the evaluation of "C" refers to fraying due to intrinsic factors of a treated cord, and thus is determined as not acceptable as a product. The intrinsic factors mean that the binding force between the fibers due to treatment(s) is inferior to the restoring force of the fibers against distortion due to post-processing such as extension or due to twisted yarn that the aramid fiber latently possesses in the treated cord.

[Bending Fatigue Resistance]

Figure 4:
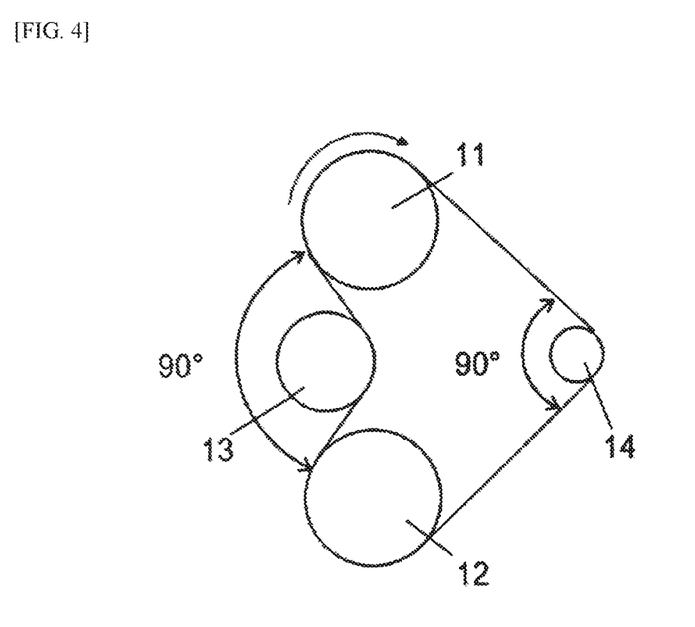
FIG. 4 is a schematic view illustrating a test machine for measuring bending fatigue resistance of V-ribbed belts obtained in Examples and Comparative Examples.

As illustrated in FIG. 4, the V-ribbed belt prepared in Examples and Comparative Examples was wound to a driving pulley 11 (diameter 120 mm, rotation speed 4,900 rpm), a driven pulley 12 (diameter 120 mm, load: 8.8 kW), an idler pulley 13 (diameter 70 mm), and a tension pulley 14 (diameter 45 mm, axial load: 21 kgf (constant)). A tensile breaking strength (residual strength) (N) after traveling for 300 hours was measured at an atmospheric temperature of 120° C., and the bending fatigue resistance was evaluated. In the belt traveling test, the belt continued receiving reverse bending and repeated bending of a minimum pulley diameter of 45 mm, and the bending fatigue of the aramid fibers and the fatigue damage in the inter-fiber treatment layer synergistically deteriorates tensile breaking strength of the tension member and the belt. For this reason, those having high residual strength can be determined to have excellent bending fatigue resistance and durability of the belt. As the detailed index, a strength retention rate is preferably 80% or more, and 70% of the strength retention rate is slightly poor but is not a problematic level as a product (may become NG depending on the use conditions).

Examples 1 to 9 and Comparative Examples 1 to 5

(Preparation of First Treatment Agent)

To an RFL liquid (RFL-X, RFL-Y, RFL-Z, RFL-W) having the composition shown in Table 1 or to a carboxy-modified latex not containing RF condensate were blended a polycarbodiimide resin, a blocked isocyanate, and a water-soluble epoxy compound at a ratio shown in Tables 2 and 3, followed by stirring at room temperature for 10 minutes to prepare a first treatment agent having the composition shown in Tables 2 and 3.

TABLE 2

| Blending agent (g) | | Example 1 | | Example 2 | | Example 3 | | Example 4 | | Example 5 | |
|---|---|---|---|---|---|---|---|---|---|---|---|
| | | Blend amount | Solid content | Blend amount | Solid content | Blend amount | Solid content | Blend amount | Solid content | Blend amount | Solid content |
| RFL-X | COOH-modified NBR | 625 | 100 | 625 | 100 | 625 | 100 | 625.0 | 100 | 625.0 | 100 |
| | RF condensate | | 25 | | 25 | | 25 | | 25 | | 25 |
| RFL-Z | COOH-modified NBR | — | — | — | — | — | — | — | — | — | — |
| | RF condensate | — | — | — | — | — | — | — | — | — | — |
| RFL-W | COOH-modified VP | — | — | — | — | — | — | — | — | — | — |
| | RF condensate | — | — | — | — | — | — | — | — | — | — |
| Polycarbodiimide dispersion liquid A | | — | — | — | — | 12.5 | 5 | 25 | 10 | 12.5 | 5 |
| Polycarbodiimide dispersion liquid B | | 2.5 | 1 | 12.5 | 5 | — | — | — | — | — | — |
| Blocked isocyanate dispersion liquid | | — | — | — | — | — | — | — | — | 33.3 | 10 |
| Water | | 97.5 | — | 87.5 | — | 87.5 | — | 75 | — | 54.2 | — |
| Sum total | | 725 | 126 | 725 | 130 | 725 | 130 | 725 | 135 | 725 | 140 |
| Total solid content concentration (% by mass) | | 17% | | 18% | | 18% | | 19% | | 19% | |

| Blending agent (g) | | Example 6 | | Example 7 | | Example 8 | | Example 9 | |
|---|---|---|---|---|---|---|---|---|---|
| | | Blend amount | Solid content | Blend amount | Solid content | Blend amount | Solid content | Blend amount | Solid content |
| RFL-X | COOH-modified NBR | 625 | 100 | 625 | 100 | — | — | — | — |
| | RF condensate | | 25 | | 25 | — | — | — | — |
| RFL-Z | COOH-modified NBR | — | — | — | — | 700 | 100 | — | — |
| | RF condensate | — | — | — | — | | 100 | — | — |

TABLE 2-continued

| | | | | | | | | | |
|---|---|---|---|---|---|---|---|---|---|
| RFL-W | COOH-modified VP | — | — | — | — | — | — | 625 | 100 |
| | RF condensate | — | — | — | — | — | — | | 25 |
| Polycarbodiimide dispersion liquid A | | — | — | 37.5 | 15 | 12.5 | 5 | 12.5 | 5 |
| Polycarbodiimide dispersion liquid B | | 1.3 | 0.5 | — | — | — | — | — | — |
| Blocked isocyanate dispersion liquid | | — | — | — | — | — | — | — | — |
| Water | | 98.8 | — | 62.5 | — | 12.5 | — | 87.5 | — |
| Sum total | | 725 | 125.5 | 725 | 140 | 725 | 205 | 725 | 130 |
| Total solid content concentration (% by mass) | | | 17% | | 19% | | 28% | | 18% |

TABLE 3

| | | Comparative Example 1 | | Comparative Example 2 | | Comparative Example 3 | | Comparative Example 4 | | Comparative Example 5 | |
|---|---|---|---|---|---|---|---|---|---|---|---|
| Blending agent (g) | | Blend amount | Solid content | Blend amount | Solid content | Blend amount | Solid content | Blend amount | Solid content | Blend amount | Solid content |
| RFL-X | COOH-modified NBR | 625 | 100 | 625 | 100 | — | — | — | — | — | — |
| | RF resin | | 25 | | 25 | — | — | — | — | — | — |
| RFL-Y | Unmodified NBR | — | — | — | — | 625 | 100 | 625 | 100 | — | — |
| | RF resin | — | — | — | — | | 25 | | 25 | — | — |
| COOH-modified NBR | | — | — | — | — | — | — | — | — | 263.2 | 100 |
| Polycarbodiimide dispersion liquid A | | — | — | — | — | 12.5 | 5 | — | — | 12.5 | 5 |
| Polycarbodiimide dispersion liquid B | | — | — | — | — | — | — | — | — | — | — |
| Blocked isocyanate dispersion liquid | | 33.3 | 10 | 66.7 | 20 | — | — | — | — | — | — |
| Water-soluble epoxy compound | | — | — | — | — | — | — | 20 | 20 | — | — |
| Water | | 66.7 | — | 33.3 | — | 87.5 | — | 80 | — | 449.3 | — |
| Sum total | | 725 | 135 | 725 | 145 | 725 | 130 | 725 | 145 | 725 | 105 |
| Total solid content concentration (% by mass) | | | 19% | | 20% | | 18% | | 20% | | 14% |

(Preparation of Second Treatment Agent)

An RFL liquid (RFL-X) having the composition shown in Table 1 and water were blended in the proportion shown in Table 4, and stirred at room temperature for 10 minutes to prepare a second treatment agent having the composition shown in Table 4.

TABLE 4

| Blending agent (g) | | Blend amount | Solid content |
|---|---|---|---|
| RFL-X | COOH-modified NBR | 625 | 100 |
| | RF condensate | | 25 |
| | Water | 1875 | — |
| | Sum total | 2500 | 125 |
| Total solid content concentration (% by mass) | | | 5% |

(Preparation of Third Treatment Agent)

The EPDM blending rubber composition shown in Table 5 was dissolved in toluene in the proportion shown in Table 6, and polymeric isocyanate was added thereto to prepare a third treatment agent (rubber gum).

TABLE 5

| Composition | Parts by mass |
|---|---|
| EPDM | 100 |
| Stearic acid | 5 |
| Zinc oxide | 5 |
| HAF carbon black | 10 |
| Hydrous silica | 15 |
| RF condensate | 2 |

TABLE 5-continued

| Composition | Parts by mass |
|---|---|
| Anti-oxidant | 2 |
| Vulcanization accelerator MBTS | 2 |
| Hexamethoxy methylol melamine | 2 |
| Sulfur | 1 |
| Sum total (parts by mass) | 144 |

TABLE 6

| Composition | Parts by mass |
|---|---|
| EPDM blending rubber composition | 93 |
| Polymeric isocyanate | 7 |
| Toluene | 900 |
| Sum total (parts by mass) | 1000 |

(Adhesion Treatment)

Regarding Examples 1 to 4 and 6 to 9 and Comparative Examples 1 to 5, as shown below, a twisted yarn cord of the aramid fiber was subjected to 3 bath treatment of the first to third treatment agents in this order, thereby obtaining a treated cord.

That is, an untreated twisted yarn cord was immersed in the first treatment agent for 10 seconds, and subjected to a drying treatment under the condition of 150° C. for 2 minutes (first treatment step). Subsequently, the twisted yarn cord treated with the first treatment agent was immersed in the second treatment agent for 10 seconds, and was subjected to a drying treatment under the condition of 230° C.

for 2 minutes (second treatment step). Finally, after repeating three times of immersion and drying treatment of immersing the twisted yarn cord treated with the second treatment agent in the third treatment agent for 3 seconds and subjected to a drying treatment under the condition of 100° C. for 1 minute, the resultant was further subjected to a heat treatment for 2 minutes (third treatment step).

Meanwhile, regarding Example 5, a treated cord was obtained in the same manner as in the other Examples and Comparative Examples, except that the twisted yarn treated with the first treatment agent was treated with the third treatment agent, without being treated with the second treatment agent.

(Manufacturing of V-Ribbed Belt)

First, on an outer periphery of a smooth-surfaced cylindrical forming mold was wound 1 ply (1 layer) of rubber-attached cotton canvas, and on the outside of the cotton canvas was wound a sheet for an unvulcanized adhesion rubber layer formed of the rubber composition shown in Table 7. Subsequently, on the sheet for the adhesion rubber layer, the two treated cords (S twist and Z twist) were spirally spun and wound in a state where the S twist-treated cord and the Z twist-treated cord were arranged in parallel with a predetermined interval, and further thereon were wound an unvulcanized sheet for the adhesion rubber layer formed of the rubber composition shown in Table 5 and an unvulcanized sheet for the compression rubber layer formed of the rubber composition shown in Table 8 in this order. In a state where a vulcanization jacket was arranged outside the sheet for the compression rubber layer, the forming mold was put into a vulcanizer to perform vulcanization. A tubular vulcanized rubber sleeve obtained by the vulcanization was removed from the forming mold, the compression rubber layer of the vulcanized rubber sleeve was ground by a grinder to form a plurality of V-shaped grooves simultaneously, and then the vulcanized rubber sleeve was cut in a circumferential direction by a cutter so as to be round-sliced, thereby obtaining a V-ribbed belt with a circumferential length of 1,000 mm having 3 ribs (in a cross-sectional view in the direction illustrated in FIG. 1, the S twist-treated cord and the Z twist-treated cord were alternatively arranged in the obtained belt). Evaluation results of the obtained belt are shown in Table 9.

TABLE 7

| Adhesion rubber layer (composition) | Parts by mass |
| --- | --- |
| EPDM | 100 |
| Stearic acid | 1 |
| Zinc oxide | 5 |
| Anti-oxidant | 2 |
| HAF carbon black | 50 |
| Hydrous silica | 20 |
| Paraffin oil | 7 |
| RF condensate | 2 |
| Vulcanization accelerator DM | 2 |
| Sulfur | 1 |
| Sum total | 190 |

TABLE 8

| Compression rubber layer (composition) | Parts by mass |
| --- | --- |
| EPDM | 100 |
| Polyamide short fiber | 25 |
| Stearic acid | 1 |
| Zinc oxide | 5 |
| Anti-oxidant | 2 |
| HAF carbon black | 50 |
| Calcium carbonate | 20 |
| Paraffin oil | 7 |
| Bismaleimide | 2 |
| Organic peroxide | 8 |
| Sum total | 220 |

TABLE 9

| Main component of first treatment agent (mass ratio) | Examples | | | | | | | | | Comparative Examples | | | | |
| --- | --- | --- | --- | --- | --- | --- | --- | --- | --- | --- | --- | --- | --- | --- |
| | 1 | 2 | 3 | 4 | 5 | 6 | 7 | 8 | 9 | 1 | 2 | 3 | 4 | 5 |
| RF condensate | 25 | 25 | 25 | 25 | 25 | 25 | 25 | 100 | 25 | 25 | 25 | 25 | 25 | — |
| COOH-modified NBR | 100 | 100 | 100 | 100 | 100 | 100 | 100 | 100 | — | 100 | 100 | — | — | 100 |
| COOH-modified VP | — | — | — | — | — | — | — | — | 100 | — | — | — | — | — |
| Unmodified NBR | — | — | — | — | — | — | — | — | — | — | — | 100 | 100 | — |
| Polycarbodiimide resin (NCN equivalent 445) | — | — | 5 | 10 | 5 | — | 15 | 5 | 5 | — | — | 5 | — | 5 |
| Polycarbodiimide resin (NCN equivalent 310) | 1 | 5 | — | — | — | 0.5 | — | — | — | — | — | — | — | — |
| Blocked isocyanate | — | — | — | — | 10 | — | — | — | — | 10 | 20 | — | — | — |
| Water-soluble epoxy compound | — | — | — | — | — | — | — | — | — | — | — | — | 20 | — |
| Second treatment agent | | | RFL | | | — | | | | RFL | | | | |
| Third treatment agent | | | | | | | Rubber gum | | | | | | | |
| Fraying resistance | B | A | A | A | B | B | B | A | A | C | C | C | C | C |
| Bending fatigue resistance — Belt tensile strength (before traveling) (kN) | 7.0 | 6.8 | 7.1 | 6.9 | 6.8 | 7.0 | 6.8 | 6.4 | 7.0 | 6.9 | 6.6 | 7.0 | 7.0 | 7.1 |
| Residual strength after belt traveling (kN) | 5.7 | 5.8 | 6.0 | 5.7 | 5.5 | 5.6 | 5.2 | 4.5 | 5.9 | 5.6 | 5.2 | 5.4 | 5.7 | 5.3 |
| Strength retention rate (%) | 81 | 85 | 85 | 83 | 81 | 80 | 76 | 70 | 84 | 81 | 79 | 77 | 81 | 75 |

As apparent from the results of Table 9, since the first treatment agent in Examples 2 to 4 contained an RF condensate, a carboxy-modified latex and a polycarbodiimide resin, both of firm adhesion of the aramid fiber (fraying resistance) and flexibility (bending fatigue resistance) were achieved in high level.

On the other hand, although the first treatment agent in Example 1 also contained an RF condensate, a carboxy-modified latex and a polycarbodiimide resin, the blend amount of the polycarbodiimide resin was 1 part by mass, which was a small amount as compared to Examples 2 to 4. Therefore, the fraying resistance deteriorated, which was, however, at a level acceptable as a product.

The first treatment agent in Example 6 is an example with a small blend amount of the polycarbodiimide resin, that is, 0.5 parts by mass, which showed significantly deteriorated fraying resistance as compared to those in Examples 1 to 5 and thus, revealed that the small blending amount provides only small effect on fraying resistance.

The first treatment agent of Example 7 is an example in which the blend amount of the polycarbodiimide resin was increased to 15 parts by mass. However, in this large amount case, the fraying resistance improving effect was only marginal and even decreased. It is considered that the reason is because the carbodiimide group becomes excessive with respect to the active hydrogen group, and a non-reacted polycarbodiimide resin deteriorates the adhesion strength. In addition, the bending fatigue resistance also deteriorated as compared to those of Examples 1 to 5.

On the contrary, the first treatment agents of Comparative Examples 1 and 2 are examples in which blocked isocyanate was used instead of the polycarbodiimide resin, which showed poor fraying resistance as compared to those of Examples 1 to 5 and thus, revealed that the combination of the carboxy-modified latex with the blocked isocyanate provides smaller effect on fraying resistance than the combination with the polycarbodiimide resin.

The first treatment agent of Example 5 is an example in which the blocked isocyanate was also used as a curing (cross-linking) agent in addition to the polycarbodiimide resin in the blending of Example 3, and treatment was not performed with the second treatment agent. The effect of the blocked isocyanate was small, and fraying resistance further deteriorated as compared to that of Example 3, which was, however, at a level acceptable as a product. In addition, as compared to Comparative Examples 1 and 2 in which only blocked isocyanate was used as a curing (cross-linking) agent, Example 5 in which the polycarbodiimide resin was also used showed excellent fraying resistance, which also evidences that the polycarbodiimide resin is more effective than the blocked isocyanate.

The first treatment agent of Comparative Example 3 is an example in which an unmodified latex was used instead of the carboxy-modified latex in the blending of Example 3, which showed deteriorated fraying resistance as compared to Example 3. It can be said that the combination of the carboxy-modified latex and the polycarbodiimide resin is effective.

The first treatment agent of Example 9 is an example in which a carboxy-modified styrene-butadiene-vinylpyridine copolymer latex was used instead of a carboxy-modified NBR latex as a carboxy-modified latex in the blending of Example 3, which showed good fraying resistance and strength retention rate similar to Example 3. It was found that the rubber component of the carboxy-modified latex used in the first treatment agent is not limited to NBR and other rubber components are also effective.

The first treatment agent of Comparative Example 4 is an example in which an RF condensate, a latex and a water-soluble epoxy compound were combined but a curing (cross-linking) agent was not contained, which showed deteriorated fraying resistance as compared to Examples 1 to 5 using a curing (cross-linking) agent.

The first treatment agent of Comparative Example 5 is an example in which a carboxy-modified latex and a polycarbodiimide resin were combined but an RF condensate was not contained, which showed deteriorated fraying resistance as compared to Examples 1 to 5. It was found that a treatment agent containing an RF condensate, a carboxy-modified latex and a polycarbodiimide resin is effective.

The first treatment agent of Example 8 is a treatment agent containing an RF condensate, a carboxy-modified latex and a polycarbodiimide resin. However, since the blend ratio of the resin component (RF condensate) to the rubber component (latex) was large, the generated adhesive layer became rigid and flexibility deteriorated. As a result, bending fatigue resistance deteriorated as compared to Examples 1 to 5, which was, however, a level acceptable as a product.

The present invention has been explained in detail and with reference to specific embodiments, but it is obvious to those skilled in the art that various modifications or changes can be added without departing from the gist and the scope of the present invention.

The present application is based on the Japanese Patent Application No. 2015-213243 filed on Oct. 29, 2015 and Japanese Patent Application No. 2016-204528 filed on Oct. 18, 2016, the contents of which are incorporated as references herein.

INDUSTRIAL APPLICABILITY

The cord for a power transmission belt obtained by the manufacturing method of the present invention is excellent in bending fatigue resistance and fraying resistance, and thus is appropriate for use in power transmission belts [e.g., a frictional power transmission belt such as a V belt and a V-ribbed belt, a meshing power transmission belt such as a toothed belt and a double-sided toothed belt, etc.]. In addition, the cord for a power transmission belt obtained by the manufacturing method of the present invention is also excellent in adhesiveness to rubber, and thus is also appropriate for belts (e.g., a raw-edge cogged V belt) used in a transmission in which a transmission ratio is continuously varied during belt traveling.

DESCRIPTION OF REFERENCE NUMERALS AND SIGNS

1 . . . Cord (tension member) for power transmission belt
2 . . . Adhesion rubber layer
3 . . . Compression rubber layer
4 . . . Tension rubber layer
5 . . . Rib
6 . . . Short fiber
11 . . . Driving pulley
12 . . . Driven pulley
13 . . . Idler pulley
14 . . . Tension pulley

The invention claimed is:

1. A method for manufacturing a cord for a power transmission belt comprising a first treatment step of treating an untreated yarn of a cord the power transmission belt with a first treatment agent comprising: a rubber composition (A) comprising a condensate (A1) of a resorcin and formaldehyde, a rubber component (A2) comprising a carboxy-modified latex, and a curing agent (A3) comprising a polycarbodiimide resin having a plurality of carbodiimide groups; and a hydrophilic solvent (B), wherein the polycarbodiimide resin is an aqueous polycarbodiimide resin, and the aqueous polycarbodiimide resin forms micelles in the first treatment agent, wherein the carboxy-modified latex is at least one selected from the group consisting of a carboxy-modified acrylonitrile-butadiene copolymer latex, a carboxy-modified hydrogenated acrylonitrile-butadiene copolymer latex, a carboxy-modified styrene-butadiene copolymer latex, and a carboxy-modified styrene-butadiene-vinylpyridine copolymer latex, wherein a proportion of the condensate (A1) is 10 to 100 parts by mass relative to 100 parts by mass of the rubber component (A2), wherein the polycarbodiimide resin has a chemical formula weight (NCN equivalent) per mole of a carbodiimide group of 300 to 450, and wherein the hydrophilic solvent (B) comprises water.

2. The manufacturing method according to claim 1, wherein a proportion of the curing agent (A3) is 1 to 10 parts by mass relative to 100 parts by mass of the rubber component (A2).

3. The manufacturing method according to claim 1, wherein a proportion of the rubber composition (A) is 15% to 20% by mass based on the entirety of the first treatment agent.

4. The manufacturing method according to claim 1, comprising a second treatment step of treating a first treated yarn of the cord for the power transmission belt treated in the first treatment step with a second treatment agent comprising a resorcin, formaldehyde and a latex.

5. The manufacturing method according to claim 4, comprising a third treatment step of treating a second treated yarn of the cord for the power transmission belt treated with the second treatment agent comprising a resorcin, formaldehyde and a latex in the second treatment step with a third treatment agent comprising a rubber.

6. The manufacturing method according to claim 1, comprising a third treatment step of treating the first treated yarn of the cord for the power transmission belt treated in the first treatment step with a third treatment agent comprising a rubber.

7. The manufacturing method according to claim 1, wherein the untreated yarn of the cord for the power transmission belt is a twisted yarn cord.

8. The manufacturing method according to claim 1, wherein the cord for the power transmission belt is an aramid cord.

9. The manufacturing method according to claim 1, wherein the polycarbodiimide resin has repeating units represented by Formula (I):

$$-(N=C=N-R)-\qquad(I)$$

wherein R is a substituted or unsubstituted divalent hydrocarbon group comprising an aliphatic hydrocarbon group, an alicyclic hydrocarbon group, an aromatic hydrocarbon group, or a combination thereof.

10. The manufacturing method according to claim 9, wherein the repeating unit R in Formula (I) has a hydrophilic group or the polycarbodiimide resin has a terminal group that is blocked by a hydrophilic group.

11. The manufacturing method according to claim 1, wherein the polycarbodiimide resin has no hydrophilic group, and wherein the polycarbodiimide resin forms micelles in the first treatment agent by being combined with a surfactant.

12. The manufacturing method according to claim 1, wherein the carboxy-modified latex is at least one selected from the group consisting of the carboxy-modified acrylonitrile-butadiene copolymer latex, the carboxy-modified hydrogenated acrylonitrile-butadiene copolymer latex, and the carboxy-modified styrene-butadiene-vinylpyridine copolymer latex.

* * * * *